United States Patent
Steedman Henderson et al.

(10) Patent No.: US 11,132,988 B1
(45) Date of Patent: Sep. 28, 2021

(54) DIALOGUE SYSTEM, A DIALOGUE METHOD, AND A METHOD OF TRAINING

(71) Applicant: PolyAI Limited, London (GB)

(72) Inventors: Matthew Steedman Henderson, Singapore (SG); Pei-Hao Su, London (GB); Tsung-Hsien Wen, London (GB); Inigo Casanueva Perez, London (GB); Nikola Mrksic, London (GB); Ivan Vulic, London (GB)

(73) Assignee: PolyAI Limited, London (GB)

( * ) Notice: Subject to any disclaimer, the term of this patent is extended or adjusted under 35 U.S.C. 154(b) by 0 days.

(21) Appl. No.: 17/077,004

(22) Filed: Oct. 22, 2020

(51) Int. Cl.
  *G10L 15/16* (2006.01)
  *G10L 15/06* (2013.01)
  *G10L 15/22* (2006.01)
  *G06K 9/62* (2006.01)
  *G10L 15/08* (2006.01)

(52) U.S. Cl.
  CPC .......... *G10L 15/063* (2013.01); *G06K 9/6277* (2013.01); *G10L 15/083* (2013.01); *G10L 15/22* (2013.01); *G10L 2015/0631* (2013.01); *G10L 2015/223* (2013.01)

(58) Field of Classification Search
  CPC .................. G10L 15/22; G10L 15/16
  See application file for complete search history.

(56) References Cited

U.S. PATENT DOCUMENTS

| | | | |
|---|---|---|---|
| 9,369,410 B2 | 6/2016 | Capper et al. | |
| 10,268,679 B2 | 4/2019 | Li et al. | |
| 2016/0350288 A1* | 12/2016 | Wick | G06F 40/242 |
| 2017/0372199 A1* | 12/2017 | Hakkani-Tur | G06N 3/08 |
| 2017/0372200 A1 | 12/2017 | Chen et al. | |
| 2020/0152184 A1* | 5/2020 | Steedman Henderson | G10L 15/197 |
| 2020/0175119 A1* | 6/2020 | Chung | G06F 40/30 |

OTHER PUBLICATIONS

Henderson, Matthew, et al. "Convert: Efficient and accurate conversational representations from transformers." arXiv preprint arXiv: 1911.03688 (2019). (Year: 2019).*

(Continued)

*Primary Examiner* — Jialong He
(74) *Attorney, Agent, or Firm* — Bracewell LLP; Christopher L. Drymalla

(57) ABSTRACT

A computer implemented method comprising: receiving input data relating to a speech or text signal originating from a user; representing the input data as a first sequence of first representations, each representing a unit of the input data; representing the input data as a second sequence of second representations, each representing one of the units of the input data; using a model to determine a tag sequence from the first sequence of first representations, wherein the model comprises an attention layer using the second sequence of second representations, wherein the tag sequence comprises one or more tags from a set of tags comprising a first tag; if one or more units of the input data correspond to the first tag, determining a system dialogue act based on the part of the input data corresponding to the first tag; and outputting speech or text information specified by the determined dialogue act.

20 Claims, 17 Drawing Sheets

(56) References Cited

OTHER PUBLICATIONS

Henderson, Matthew, et al. "Training neural response selection for task-oriented dialogue systems." arXiv preprint arXiv: 1906.01543 (Jun. 7, 2019). (Year: 2019).*

Henderson, Matthew, et al. "PolyResponse: A Rank-based Approach to Task-Oriented Dialogue with Application in Restaurant Search and Booking." arXiv preprint arXiv: 1909.01296 (2019). (Year: 2019).*

Coope, Sam, et al. "Span-ConveRT: Few-shot Span Extraction for Dialog with Pretrained Conversational Representations." arXiv preprint arXiv:2005.08866 (Jul. 16, 2020). (Year: 2020).*

Al-Rfou, Rami et al.; "Conversational Contextual Cues: The Case of Personalization and History for Response Ranking" arXiv:1606.00372v1 [cs:CL], Jun. 1, 2016; pp. 1-10.

Brown, Tom B. et al.; "Language Models are Few-Shot Learners" arXiv:2005.14165v4 [cs.CL] Jul. 22, 2020; pp. 1-75.

Bunk, Tanja et al.; "DIET: Lightweight Language Understanding for Dialogue Systems" arXiv:2004.09936v3 [cs:CL] May 11, 2020; pp. 1-9.

Casanueva, Inigo et al.; "Efficient Intent Detection with Dual Sentence Encoders" arXiv:2003.04807v1 [cs:CL] Mar. 10, 2020; pp. 1-8.

Cer, Daniel et al.; "Universal Sentence Encoder" arXiv:1803.11175v2 [cs:CL] Apr. 12, 2018; pp. 1-7.

Coope, Sam et al.; "Span-ConveRT: Few-shot Span Extraction for Dialog with Pretrained Conversational Representations" arXiv:2005.08866v2 [cs:CL] Jul. 16, 2020; pp. 1-15.

Coucke, Alice et al.; "Snips Voice Platform: an embedded Spoken Language Understanding system for private-by-design voice interfaces" arXiv:1805.10190v3 [cs:CL] Dec. 6, 2018; pp. 1-29.

Devlin, Jacob et al.; "BERT: Pre-training of Deep Bidirectional Transformers for Language Understanding" Proceedings of NAACL-HLT 2019, Minneapolis, Minnesota, Jun. 2-7, 2019; pp. 4171-4186.

Glass, Michael et al.; "Span Selection Pre-training for Question Answering" arXiv:1909.04120v2 [cs:CL] Jun. 18, 2020; pp. 1-10.

Henderson, Matthew et al.; "A Repository of Conversational Datasets" arXiv:1904.06472v2 [cs:CL] May 29, 2019; pp. 1-10.

Henderson, Matthew et al.; "Efficient Natural Language Response Suggestion for Smart Reply" arXiv:1705.00652v1 [cs:CL], May 1, 2017; pp. 1-15.

Henderson, Matthew et al.; "Training Neural Response Selection for Task-Oriented Dialogue Systems" arXiv:1906.01543v2 [cs.CL] Jun. 7, 2019; pp. 1-13.

Hendrycks, Dan et al.; "Gaussian Error Linear Units (GELUs)" arXiv:1606.08415v3 [cs:LG] Nov. 11, 2018; pp. 1-9.

Hou, Yutai et al.; "Few-shot Slot Tagging with Collapsed Dependency Transfer and Label-enhanced Task-adaptive Projection Network" arXiv:2006.05702v1 [cs.CL] Jun. 10, 2020.

Humeau, Samuel et al.; "Poly-Encoders: Architectures and Pre-Training Strategies for Fast and Accurate Multi-Sentence Scoring" arXiv:1905.01969v4 [cs.CL] Mar. 25, 2020; pp. 1-14.

Kingma, Diederik et al.; "ADAM: A Method for Stochastic Optimization" arXiv:1412.6980v9 [cs.LG] Jan. 30, 2017; pp. 1-15.

Krone, Jason et al.; "Learning to Classify Intents and Slot Labels Given a Handful of Examples" arXiv:2004.10793v1 [cs.CL] Apr. 22, 2020; pp. 1-10.

Liu, Bing et al.; "Attention-Based Reccurent Neural Network Models for Joint Intent Detection and Slot Filling" arXiv:1609.01454v1 [cs.CL] Sep. 6, 2016; pp. 1-5.

Liu, Yinhan et al.; "RoBERTa: A Robustly Optimized Bert Pretraining Approach" arXiv:1907.11692v1 [cs.CL] Jul. 26, 2019; pp. 1-13.

Loshchilov, Ilya et al.; "SGDR: Stochastic Gradient Descent with Warm Restarts" Published as a conference paper at ICLR 2017; pp. 1-16.

Mehri, Shikib et al.; "DialoGLUE: A Natural Language Understanding Benchmark for Task-Oriented Dialogue" arXiv:2009.13570v2 [cs.CL] Oct. 1, 2020; pp. 1-9.

Namazifar, Mandi et al.; "Language Model is All You Need: Natural Language Understanding as Question Answering" arXiv:2011.03023v1 [cs.CL] Nov. 5, 2020; pp. 1-5.

Namazifar, Mandi et al.; "Warped Language Models for Noise Robust Language Understanding" arXiv:2011.01900v1 [cs.CL] Nov. 3, 2020; pp. 1-8.

Rastogi, Abhinav et al.; "Towards Scalable Multi-Domain Conversational Agents: The Schema-Guided Dialogue Dataset" arXiv:1909.05855v2 [cs.CL] Jan. 29, 2020.

Roller, Stephen et al.; "Open-Domain Conversational Agents: Current Progress, Open Problems, and Future Directions" arXiv:2006.12442v2 [cs.CL] Jul. 13, 2020; pp. 1-21.

Sutton, Charles et al.; "An Introduction to Conditional Random Fields", Foundations and Trends® in Machine Learning: (2012) vol. 4: No. 4, Full text available at: http://dx.doi.org/10.1561/2200000013; pp. 1-23.

Vaswani, Ashish et al.; "Attention is All You Need" 31st Conference on Neural Information Processing Systems (NIPS 2017), Long Beach; pp. 1-11.

Vaswani, Ashish et al.; "Tensor2Tensor for Neural Machine Translation" Proceedings of AMTA 2018, vol. 1:MT Research Track, Boston, Mar. 17-21, 2018; pp. 193-199.

Zeiler, Matthew D.; "ADADELTA: An Adaptive Learning Rate Method" arXiv:1212.5701v1 [cs.LG] Dec. 22, 2012; pp. 1-6.

Zhang, Yuhao et al.; "Position-aware Attention and Supervised Data Improve Slot Filling" Proceedings of the 2017 Conference on Empirical Methods in Natural Language Processing, Copenhagen, Denmark, Sep. 7-11, 2017; pp. 35-45.

* cited by examiner

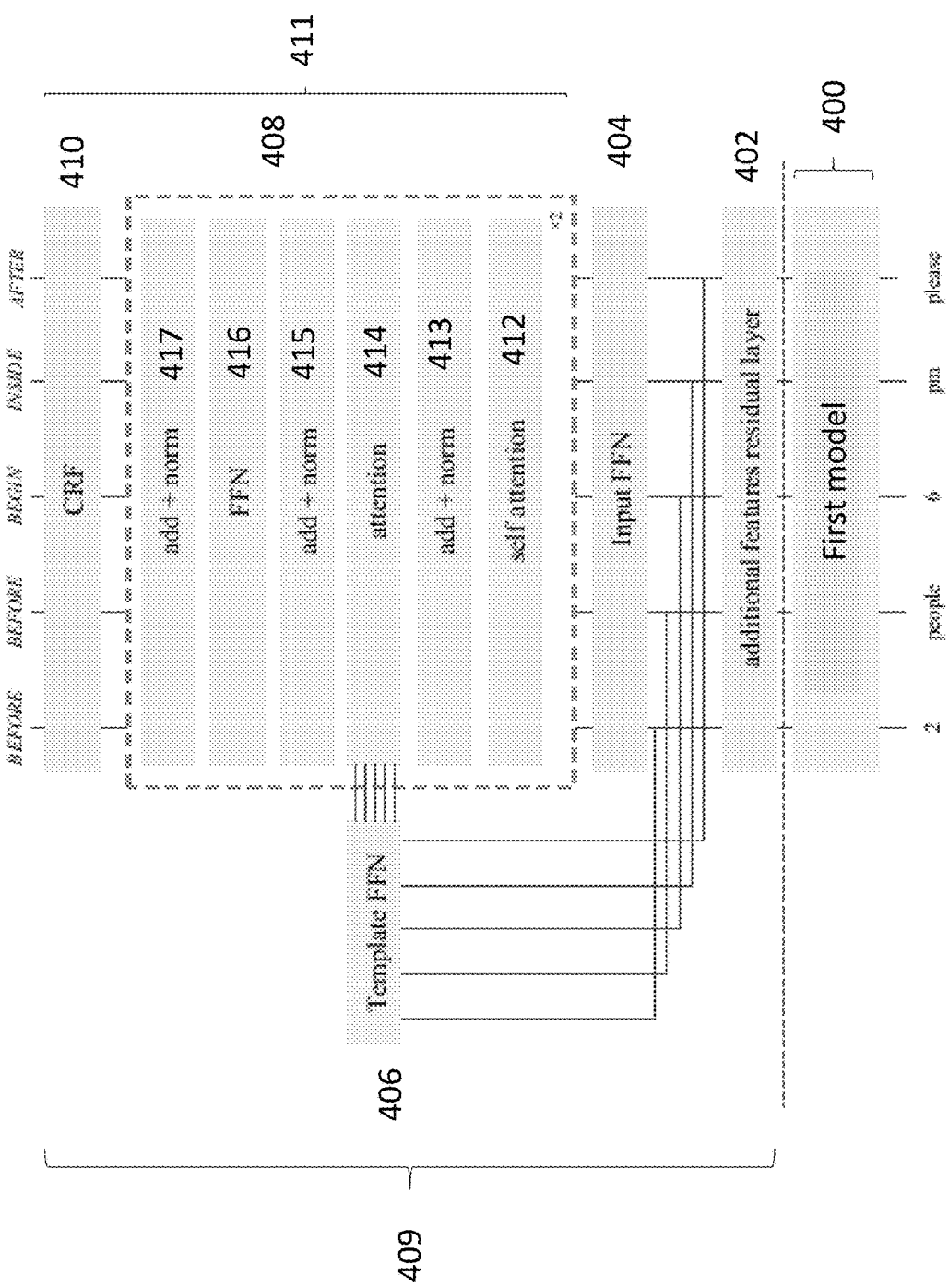

Figure 5(c)

```
subword_split(
"polyAI develops a machine learning platform for conversational artificial intelligence.")

_poly -ai _develop -s _a _machine _learning _platform _for _conversation -al _artificial _int
elligence _.

subword_split("the subword vocab is learned over 10M reddit examples")

_the _sub -word _voca -b _is _learned _over _10m _reddit _examples subword_split("it includes 'words' like 'covfefe'")

_it _includes _' _words _,' _like _covfefe subword_split("mockumentary, flexitarian, singlish, staycation")

_mock -ument -ary _,_ flexi -tarian _,_ sing -lish _,_ stay -cation
```

US 11,132,988 B1

DIALOGUE SYSTEM, A DIALOGUE METHOD, AND A METHOD OF TRAINING

FIELD

Embodiments described herein relate to a system, a method, and a method of training a model. More particularly, embodiments described herein relate to a dialogue system, a dialogue method, and a method of training a model for a dialogue system.

BACKGROUND

Dialogue systems or conversational user interfaces, for example chatbots or voice-based agents, are used in many applications such as search, recommendation, booking, telephone help systems, customer service, and e-banking amongst others.

Slot labelling or slot filling is a component used in task-oriented dialogue systems. Its goal is to fill the correct slot "values" associated with various slots. For example, a dialogue system for restaurant bookings may fill "slots" such as date, time and the number of guests, with "values" extracted from a user input, for example: next Thursday, 7 pm, and 4 people.

Such components may utilise large models, comprising a large number of trainable parameters. Such models have large memory requirements and may require long periods to train. Furthermore, training the model to support a new task may be challenging due to scarcity of annotated data for an intended use scenario.

There is a continuing need to provide models for dialogue systems that are memory efficient. There is furthermore a continuing need to provide models that are efficient to train, and models that can be trained for new domains where data is scarce.

BRIEF DESCRIPTION OF FIGURES

Systems and methods in accordance with non-limiting embodiments will now be described with reference to the accompanying figures in which:

FIG. 4(*b*) shows the inputs and outputs at various stages of the method of FIG. 3;

FIG. 5(*b*) shows a flowchart illustrating the operation of the first part of the first model shown in FIG. 5(*a*);

FIG. 5(*c*) shows examples of tokenisation of input text performed by the tokenisation algorithm used in the method of FIG. 5(*a*);

FIG. 6(*b*) is a schematic illustration of a first model used in a method according to an embodiment;

DESCRIPTION

Figure 1:
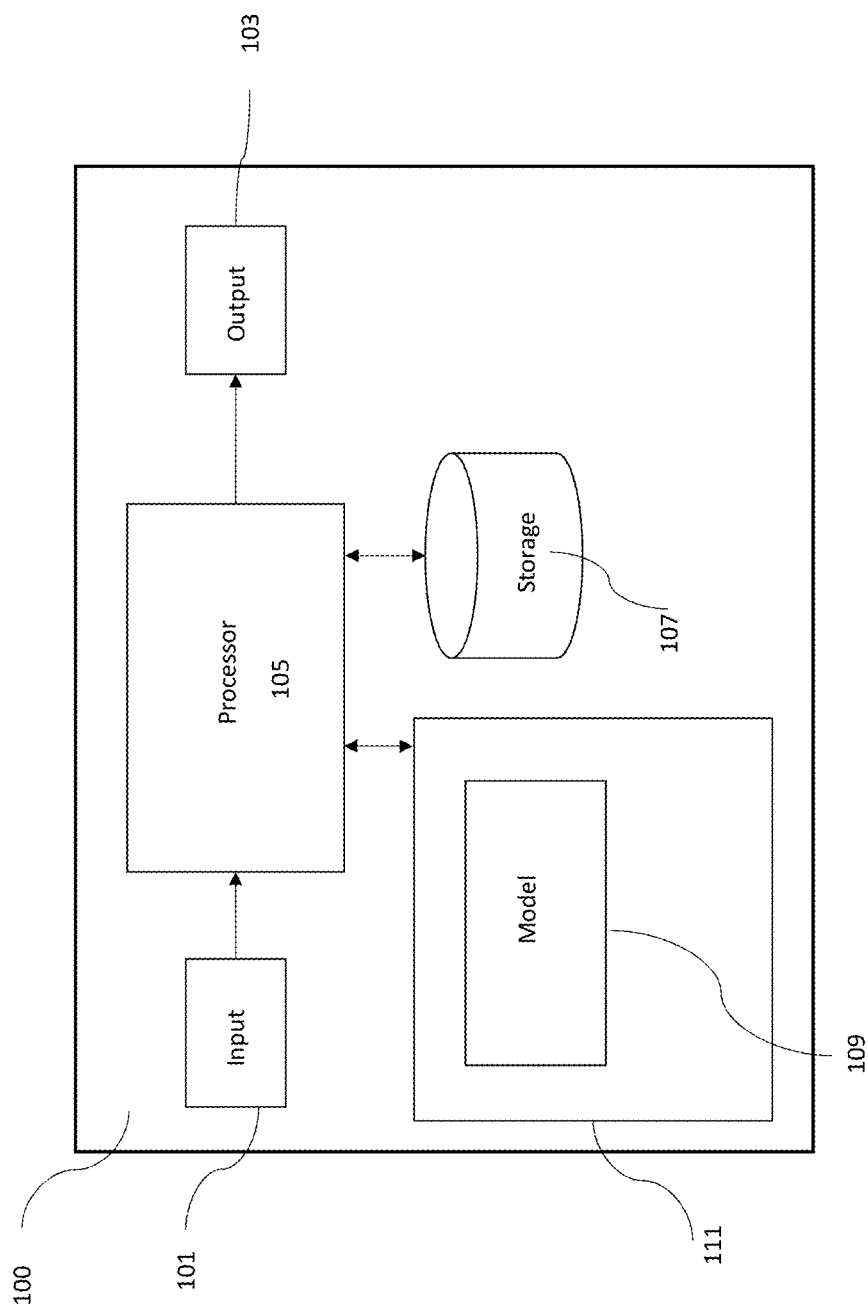
FIG. 1 is a schematic illustration of a dialogue system in accordance with an embodiment.

According to a first aspect, there is provided a computer implemented method comprising:

receiving input data relating to a speech or text signal originating from a user;

representing the input data as a first sequence of first representations, each representing a unit of the input data;

representing the input data as a second sequence of second representations, each representing one of the units of the input data;

using a model to determine a tag sequence from the first sequence of first representations, wherein the model comprises a combining layer using the second sequence of second representations, wherein the tag sequence comprises one or more tags from a set of tags comprising a first tag;

if one or more units of the input data correspond to the first tag, determining a system dialogue act based on the part of the input data corresponding to the first tag; and outputting speech or text information specified by the determined dialogue act.

The model is a trained model. In an example, the first tag is a slot value tag, and wherein the set of tags comprises a before tag, tagging a part before the slot value, and an after tag, tagging a part after the slot value.

In an example, the combining layer is an attention layer. In an example, the model is a linear chain conditional random field model.

In an example, the model is configured to generate a set of parameters for each unit representing a likelihood of each tag in the set for the unit, and a likelihood of each tag in the set for the unit together with each tag in the set for the following unit. In a further example, determining the tag sequence comprises determining the tag sequence with the highest probability from the sets of parameters.

In an example, the model is a second model, wherein the first sequence of first representations and second sequence of second representations are generated using a first model, and wherein the first model is configured to segment a user inputted query into a sequence of units from a vocabulary of units and represent each unit in the sequence as an embedding vector, wherein at least one of the units in the vocabulary is an incomplete word. The first model and second model are trained models.

In an example, the first tag is a slot value tag, wherein the model is a second model corresponding to a first slot and wherein the first sequence of first representations and second sequence of second representations are generated using a first model, wherein the method further comprises: representing the input data as a third sequence of third representations, each representing a unit of the input data; representing the input data as a fourth sequence of fourth representations, each representing one of the units of the input data, wherein the third sequence of third representations and fourth sequence of fourth representations are generated using the first model; using a further model corresponding to a second slot to determine a further tag sequence from the third sequence of third representations, wherein the further model comprises a combining layer using the fourth sequence of fourth representations; if one or more units of the input data correspond to the first tag in the further tag sequence, determining the system dialogue act is further based on the part of the input data corresponding to the first tag in the further tag sequence.

In an example, the first sequence of first representations and second sequence of second representations are generated using a residual layer using information indicating whether the slot corresponding to the model was requested in the previous output.

In a further aspect, there is provided a system, comprising:
   an input for receiving input data relating to a speech or text signal originating from a user;
   an output for outputting speech or text information specified by a dialogue act; and
   one or more processors, the one or more processors being configured to:
      represent the input data as a first sequence of first representations, each representing a unit of the input data;
      represent the input data as a second sequence of second representations, each representing one of the units of the input data;
      use a model to determine a tag sequence from the first sequence of first representations, wherein the model comprises a combining layer using the second sequence of second representations, wherein the tag sequence comprises one or more tags from a set of tags, wherein the set of tags comprises a first tag; and
      if one or more units of the input data correspond to the first tag, determine a system dialogue act based on the part of the input data corresponding to the first tag;
      output speech or text information specified by the determined dialogue act.

In a further aspect, there is provided a computer implemented method of training a model, comprising:
   receiving input data relating to a speech or text signal and template data relating to a speech or text signal, wherein a first part of the input data corresponds to a first unit in the template data;
   representing the input data as a first sequence of first representations, each representing a unit of the input data;
   representing the template data as a second sequence of second representations, each representing a unit of the template data including the first unit;
   using a model to determine a tag sequence from the first sequence of first representations, wherein the model comprises a combining layer using the second sequence of second representations, wherein the tag sequence comprises one or more tags from a set of tags, wherein the set of tags comprises a first tag;
   training the model to identify the first part of the input data as corresponding to the first tag.

In an example, the model is a second model and wherein the first sequence of first representations and second sequence of second representations are generated using a first model, and wherein the method further comprises training the first model together with the second model.

In an example, the method further comprises: receiving further input data relating to a speech or text signal, wherein a first part of the further input data corresponds to a slot value; representing the further input data as a further sequence of first representations using the first model, each representing a unit of the further input data; representing the input data as a further sequence of second representations using the first model, each representing one of the units of the further input data; using the second model to determine a tag sequence from the further sequence of first representations; training the second model to identify the first part of the input data as corresponding to the first tag, wherein the training comprises updating the parameters of the second model without updating one or more parameters of the first model.

In an example, the first model is configured to segment a user inputted query into a sequence of units from a vocabulary of units and represent each unit in the sequence as an embedding vector, wherein at least one of the units in the vocabulary is an incomplete word, wherein the vocabulary comprises the first unit.

In an example, the training is performed using labels corresponding to the input data, wherein the first part of the input data is labelled with the first tag, wherein a part of the input data before the first part is labelled with a before tag and wherein a part of the input data after the first part is labelled with an after tag.

In an example, the method further comprises: receiving further input data relating to a speech or text signal and further template data relating to a speech or text signal, wherein the template data does not comprise the first unit; representing the further input data as a further sequence of first representations, each representing a unit of the further input data; representing the further template data as a further sequence of second representations, each representing one of the units of the further template data including the first unit; using the model to determine a tag sequence from the further sequence of first representations; and training the model to identify no parts of the input data as corresponding to the first tag.

According to a further aspect, there is provided a computer implemented method of training a model, comprising:
   receiving input data relating to a speech or text signal, wherein a first part of the input data corresponds to a slot value;
   representing the input data as a first sequence of first representations, each representing a unit of the input data;
   representing the input data as a second sequence of second representations, each representing one of the units of the input data including the first unit;
   using a model to determine a tag sequence from the first sequence of first representations, wherein the model comprises a combining layer using the second sequence of second representations, wherein the tag sequence comprises one or more tags from a set of tags, wherein the set of tags comprises a first tag;
   training the model to identify the first part of the input data as corresponding to the first tag.

According to a further aspect, there is provided a method of generating data for training a model, the method comprising:
   receiving data relating to a plurality of speech or text signals;

identifying a key part of data for each signal;
determining template data and input data as a pair of signals comprising the same key part;
replacing the key part in the template data with a first unit, such that the key part of the input data corresponds to the first unit in the template data.

According to a further aspect, there is provided a system, comprising:
an input for receiving input data relating to a speech or text signal originating from a user;
an output for outputting speech or text information specified by a dialogue act; and
one or more processors, the one or more processors being configured to:
represent the input data as a first sequence of first representations, each representing a unit of the input data;
represent the input data as a second sequence of second representations, each representing one of the units of the input data;
use a model trained using any of the above methods to determine a tag sequence from the first sequence of first representations; and
if one or more units of the input data correspond to the first tag, determine a system dialogue act based on the part of the input data corresponding to the first tag;
output speech or text information specified by the determined dialogue act.

According to a further aspect, there is provided a non-transitory computer readable storage medium comprising program instructions stored thereon that are executable by a computer processor to perform the following operations:
receiving input data relating to a speech or text signal originating from a user;
representing the input data as a first sequence of first representations, each representing a unit of the input data;
representing the input data as a second sequence of second representations, each representing one of the units of the input data;
using a model to determine a tag sequence from the first sequence of first representations, wherein the model comprises a combining layer using the second sequence of second representations, wherein the tag sequence comprises one or more tags from a set of tags comprising a first tag;
if one or more units of the input data correspond to the first tag, determining a system dialogue act based on the part of the input data corresponding to the first tag; and
outputting speech or text information specified by the determined dialogue act.

The methods are computer-implemented methods. Since some methods in accordance with embodiments can be implemented by software, some embodiments encompass computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal. The carrier medium may comprise a non-transitory computer readable storage medium. According to a further aspect, there is provided a carrier medium comprising computer readable code configured to cause a computer to perform any of the above described methods.

Dialogue systems or conversational user interfaces, for example chatbots or voice-based agents, are used in many applications such as search, recommendation, booking, telephone help systems, customer service, and e-banking amongst others. Slot labelling or slot filling is a component used in task-oriented dialogue systems. Its goal is to fill the correct values associated with multiple slots. For example, a dialogue system for restaurant bookings may fill "slots" such as date, time, and the number of guests, with "values" extracted from a user input, for example: next Thursday, 7 pm, and 4 people.

Such components may utilise large models, comprising a large number of trainable parameters, and which may use categorical modelling for example. Such models have large memory requirements and require long periods to train. In examples described herein, slot-filling is treated as a span extraction problem. A value extractor model is used, which casts slot labelling as a span based extraction task. In particular, slot-filling is implemented as an intent agnostic span extraction, in which a slot value is identified as a single span of text or entirely absent. As described in examples herein, a user input is represented as a first sequence of first representations, and a trained model is used to determine a tag sequence from the first sequence of first representations. The tag sequence tags each token in the sequence with a tag from a set of tags, including a first tag which represents a slot value.

The value extractor model comprises a first model and a plurality of second models, each corresponding to a different slot. Each second model determines a tag sequence from the first sequence of first representations, wherein the second model comprises a combining layer using the second sequence of second representations. The first sequence of first representations and second sequence of second representations are generated using the first model. For each user input, the plurality of second models are run, each corresponding to a different slot. However, they all share the first model, meaning that the total memory footprint is reduced. The first model has a sequential encoder structure, and the second model has a sequential decoder structure. The value extractor model has a transformer structure.

The value extractor model is memory efficient and training efficient, while maintaining performance. This means that the value extractor model can be stored on small devices, e.g., mobile phones or tablets, with limited memory storage for example. Reduced training times also provide wider portability and scalability for sequence-labelling tasks in general.

Setting up task-oriented dialogue systems, and slot labelling methods in particular, to support new tasks and domains is challenging due to scarcity of expert annotated data for a plethora of intended use scenarios. In examples described herein, a data-efficient value extractor model is used to determine slot values. The value extractor model is able to learn from only a handful of annotated examples in few-shot scenarios for example. In particular, a transfer learning approach is used, in which a general pre-training process is performed, followed by a specific "fine-tuning" training process using annotated examples.

Transfer learning approaches may use representations from models pre-trained on large data collections in a self-supervised manner on some general natural language processing task. In examples described herein, a pre-training process which provides a strong alignment between the pre-training task and the end task is used, in other words, the pre-training task is suitable for slot labelling in conversational applications. In particular, the pre-training objective comprises sentence-pair value extraction. This aligns well with the target downstream task: slot labelling for dialogue.

The pre-training objective emulates slot labelling, relying on sentence pairs from natural language data which share a key phrase, for example a "value" for a specific "slot". One sentence is taken as input to the value extractor model, which determines a tag sequence. The value extractor model comprises a combining layer using a sequence of vector representations for the second sentence, where the key phrase is represented by a specific token in the sequence. For example, the combining layer may be an attention layer. The value extractor model predicts which tokens in the input sentence constitute the key phrase. At inference, the attention layer effectively acts like an additional self-attention layer. Performance gains may be obtained, particularly where annotated data is scarce.

Furthermore, sequence-level layers in the value extractor model are not learned from scratch, but fine-tuned using the annotated data after the pre-training. The value extractor model provides a generally applicable approach, which fine-tunes pre-trained "general" sequence-level layers without using specialized slot labelling algorithms. The value extractor model provides a conversational value extractor (ConVEx). The value extractor model is based on a Conditional Random Fields (CRF) approach, and comprises a sequence level decoder. Instead of learning the parameters for these decoder layers from scratch, the pre-trained decoder layers for sequence modelling are fine-tuned using a small number of labelled in-domain examples. The value extractor model comprises a transformer-based neural model which can be pre-trained on large quantities of natural language data and then the decoder layers are directly fine-tuned to a wide variety of slot-labelling tasks. Task-aligned pre-training from raw natural language data is particularly suited for data-efficient slot labelling with a limited number of annotated examples, which is a scenario often met in production of dialogue systems. Good performance can be achieved via quick fine-tuning, in which sequence-level layers are fine-tuned from pre-trained layers.

FIG. 1 is a schematic illustration of a dialogue system 100 in accordance with an embodiment. The system comprises an input 101, a processor 105, a working memory 111, an output 103, and storage 107. The system 100 may be a mobile device such as a laptop, tablet computer, smartwatch, or mobile phone for example. Alternatively, the system 100 may be a computing system, for example an end-user system that receives inputs from a user (e.g. via a keyboard, screen or microphone) and provides output (e.g. via a screen or speaker), or a server that receives input and provides output over a network.

The processor 105 is coupled to the storage 107 and accesses the working memory 111. The processor 105 may comprise logic circuitry that responds to and processes the instructions in code stored in the working memory 111. In particular, when executed, a value extractor model 109 is represented as a software product stored in the working memory 111. Execution of the value extractor model 109 by the processor 105 will cause embodiments as described herein to be implemented. Further components of the dialogue system as described herein, for example automatic speech recognition models, dialogue management models etc, may also be stored in the working memory 111.

The processor 105 also accesses the input module 101 and the output module 103. The input and output modules or interfaces 101, 103 may be a single component or may be divided into a separate input interface 101 and a separate output interface 103. The input module 101 receives a query through an input, which may be a receiver for receiving data from an external storage medium or a network, a microphone, screen or a keyboard for example. The output module 103 provides the response generated by the processor 105 to an output such as a speaker or screen, or a transmitter for transmitting data to an external storage medium or a network for example.

The input provided is in the form of text or audio, and the output is provided to the user in the form of text or audio. It should be noted that the system can be configured to work with one or both of text and audio signals. Working with text interfaces (and not only audio) can allow, for example, hearing impaired and mute people to also use the system. If the input is in the form of audio, an automatic speech recognition model may be included to convert the input audio to text. Any type of speech recognition process may be used, for example, a trained speech recognition algorithm based on a neural network or Hidden Markov Model may be used. If the output is to be in the form of audio, a text to speech model is included. Any type of text to speech generation model may be used.

The system may further comprise means of communication with third-party services. For example, the system may be configured to communicate with a restaurant system when attempting to finalise a restaurant booking process (to check availability for a particular date, time, and number of people for example). The communication means may comprise a connection to a communication network for example.

The storage 107 is configured to communicate with the processor 105. The storage 107 may contain data that is used by the value extractor model 109 when executed by the processor 105. As illustrated, the storage 107 is local memory that is contained in the device. Alternatively however, the storage 107 may be wholly or partly located remotely, for example, using cloud based memory that can be accessed remotely via a communication network (such as the Internet). The value extractor model 109 is stored in the storage 107. Further components of the dialogue system as described herein, for example automatic speech recognition models, dialogue management models etc, may also be stored in the storage 107. The value extractor model 109 is placed in working memory when executed. In many cases the working memory 111 of a device is limited.

As illustrated, the system 100 comprises a single processor. However, the model 109 may be executed across multiple processing components, which may be located remotely, for example, using cloud based processing. For example, the system 100 may comprise at least one graphical processing unit (GPU) and a general central processing unit (CPU), wherein various operations described in relation to the methods below are implemented by the GPU, and other operations are implemented by the CPU. For example, matrix operations or vector operations are performed by a GPU.

The value extractor model 109 comprises various trained parameters. In order to train the model 109, a method of training the model 109 is performed. This method may be performed on the same system 100 shown in FIG. 1. Alternatively, the model may be trained on a separate system (not shown). The separate system may comprise at least one graphical processing unit (GPU) for example. The separate system used to train the model may also comprise an input 101, at least one processor 105, a working memory 111, an output 103, and storage 107, where one or more components may be located remotely. The system used to train the model may be a computing system, for example an end-user system or a server that receives input and provides output over a network. Once trained, the value extractor model 109 may then be loaded onto the system of FIG. 1.

Usual procedures for the loading of software into memory and the storage of data in the storage unit 107 apply. The model 109 can be embedded in original equipment, or can be provided, as a whole or in part, after manufacture. For instance, the model 109 can be introduced, as a whole, as a computer program product, which may be in the form of a download, or can be introduced via a computer program storage medium, such as an optical disk. Alternatively, modifications to existing dialogue manager software can be made by an update, or plug-in, to provide features of the above described embodiment.

While it will be appreciated that the above embodiments are applicable to any computing system, the example computing system illustrated in FIG. 1 provides means capable of putting an embodiment, as described herein, into effect.

Figure 2:
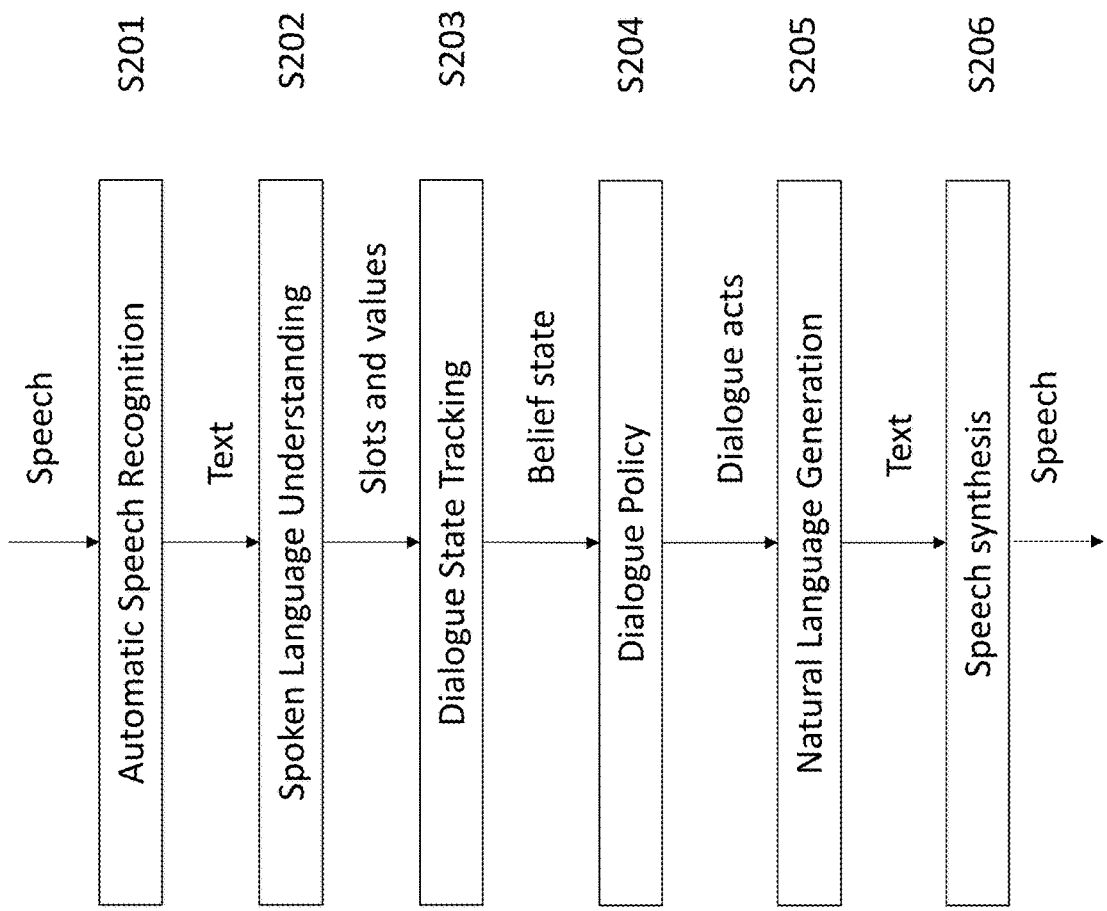
FIG. 2 shows a schematic illustration of a dialogue method according to an embodiment, in which a dialogue system interacts with a human user.

FIG. 2 shows a schematic illustration of an example dialogue method, in which a dialogue system interacts with a human user. The method may be performed on a dialogue system such as has been described in relation to FIG. 1. The dialogue method is goal-oriented. The term goal-oriented may be used interchangeably with the term task-oriented. Goal-oriented dialogue systems search and interact with large databases which contain information about a specific dialogue domain. Examples of such domains are 1) restaurant search and reservation, 2) flight bookings, 3) tourist information, 4) laptop shopping, and 5) train ticket sales, amongst others.

The input in this case is an audio input from a human user. The audio input may be received through a microphone located remotely from the dialogue system 100, and the audio signal transmitted to the dialogue system for example. Each audio input corresponds to a turn in the dialogue. A dialogue turn comprises the previous system utterance and the current user utterance.

In S201, an automatic speech recognition (ASR) step is performed, to generate a text signal from the audio input. Any type of speech recognition process may be used in the speech recognition step. For example, a trained speech recognition algorithm based on a neural network or Hidden Markov Model may be used. ASR models may assign posterior probabilities to words in an utterance given the input acoustic signal. The ASR output takes the form of an N-best list, which approximates the full posterior distributions over the ASR hypotheses by returning the top N most probable hypotheses with their respective probabilities. Alternatively, word lattices or word confusion networks may be used. In this example, only the top scoring ASR hypothesis determined in S201 is used as input to the subsequent steps (N=1). Where the user input is a text signal, the ASR step S201 is omitted, and the text signal taken directly as input to S202.

A belief state is then updated based on the text signal. The belief state is the system estimate of the dialogue state, comprising one or more slots and the corresponding slot value. In some examples, the belief state may comprise a probability value corresponding to each of a plurality of slot and value combinations for example.

The belief state update may comprise a spoken language understanding (SLU) step S202 and a dialogue state tracking (DST) step S203. These steps together may be referred to as a Natural Language Understanding step. The role of a Spoken Language Understanding (SLU) module, also known as a semantic decoder, is to convert text (i.e. ASR output) into dialogue state information, and in particular slots and values. The subsequent Dialogue State Tracking (DST) module uses this information to update the system's belief state.

To update the belief state, a rule-based approach may be used for example. In this case, the SLU module may output one or more slots and values corresponding to the user input, and a set of rules is applied to this output to generate the belief state. The belief state comprises the system estimate of the slot and value combinations mentioned by the user in the dialogue up to that point. The belief state comprises a set of slots and values output from the turns up to that point.

Alternatively, the belief state may comprise a probability distribution over possible dialogue options (e.g. slot and value combinations).

The belief state is then used by the dialogue manager in S204 to choose an appropriate system response, i.e. a dialogue act, in the manner that will be described below. Further explanation of the slots and values will first be provided however.

As explained above, in S202, a spoken language understanding step is performed. This gives a "turn-level" prediction, comprising one or more slots and values extracted from the text signal corresponding to the user input. Each dialogue domain is defined by a domain ontology. The domain ontology comprises information which can be used to model the user goal expressed up to a given point of the conversation. This point of the conversation is referred to as a "dialogue state". The domain ontology comprises one or more slots. Each dialogue slot corresponds to a subject that a speech signal may relate to. The dialogue slot may take on one or more "values". The term "value" is used here to refer to any information that fills the slot, and is not limited to numbers. A dialogue state thus comprises a set of one or more slots with their corresponding slot values. For example, a dialogue state can be specified by the fact that both food type and price range are known at that point in the dialogue, so both a food type slot and a price range slot have a corresponding value (e.g "Thai" or "Chinese, and "cheap" or "expensive").

A dialogue system for restaurant search and reservation should help the users to find and book a restaurant according to their personal taste and wishes: for example the system should book a place with cheap Thai food in central Cambridge, or recommend a cheap Chinese place in North Cambridge if the user makes inquiries about such places. Slot labelling or slot filling is a natural language understanding (NLU) component used in a task-oriented dialog system. Its goal is to fill the correct values associated with predefined slots: e.g., a dialogue system for restaurant bookings is expected to fill slots such as date, time, and the number of guests with the values extracted from a user utterance (e.g., next Thursday, 7 pm, 4 people).

An example SLU process S202 will be described in more detail in relation to FIG. 3 below. In this process, SLU is treated as a sequence labelling problem. A labelling model based on Conditional Random Fields is used. The SLU module outputs one or more slots and values corresponding to the user input for the dialogue turn. This is then used to update the belief state in the subsequent dialogue state tracking step S203. The SLU module may be fully independent of the other system components (for example the state tracker used in S203, the dialogue management component used in S204).

The output of the step S203 is an updated belief state. As described above, the dialogue state comprises one or more slot-value combinations. The belief state is the system's estimation of current dialogue state information. For slot-based systems, the belief state comprises the system estimate of the slot and value combinations mentioned by the user in the dialogue up to that point. The belief state may simply comprise a set of slots and values output from the turns up to that point, which are then directly input to the dialogue policy S204.

Alternatively, the DST S203 component uses the output of the SLU step to update a probability distribution over dialogue state information. In the belief state, a probability value is assigned to slot value combinations. Combinations not in the belief state are considered to have a probability of 0. Such dialogue state tracking may be based on hand-crafted systems, for example which use the top ASR/SLU hypothesis to map the existing belief state to a new belief state, for example an Information State Update model, which uses hand-crafted rules to maintain the information state. Other rule-based approaches may predict an updated dialogue state for each of the hypotheses provided by the ASR/SLU pipeline, and then use another hand-crafted rule to combine these estimates into a single belief state. A rule-based belief state update may depend on two factors: 1) the latest user utterance (e.g. probability distributions over the slot and value combinations generated in the SLU step); and 2) previous belief state history (in this case the previous belief state, i.e. the probability distributions over the slot and value combinations stored in the belief state after the previous dialogue turn). The relative weight of the impact of the two components determines the accuracy of the current belief state. For instance, if a complete change in the user's goal is detected, the previous belief state history is weighted less, and more weight is assigned to the latest user input. Alternatively, data-driven methods may be used. Data driven methods may be based on a generative approach or a discriminative approach. For example, generative Bayesian networks model dialogue as a dynamic Bayesian network where the (true) dialogue state $s_t$ (at time t) is treated as a hidden random variable. The system action $a_t$ and the observed user action $o_t$ are the observed variables. At each dialogue turn, Bayesian inference is used to obtain an updated estimate of the dialogue state $s_{t+1}$. Unlike generative models, discriminative models directly estimate the conditional probability $P(s_t|f)$, where f is the set of (arbitrary) features representing (optionally) ASR, SLU and dialogue history for example.

Figure 10:
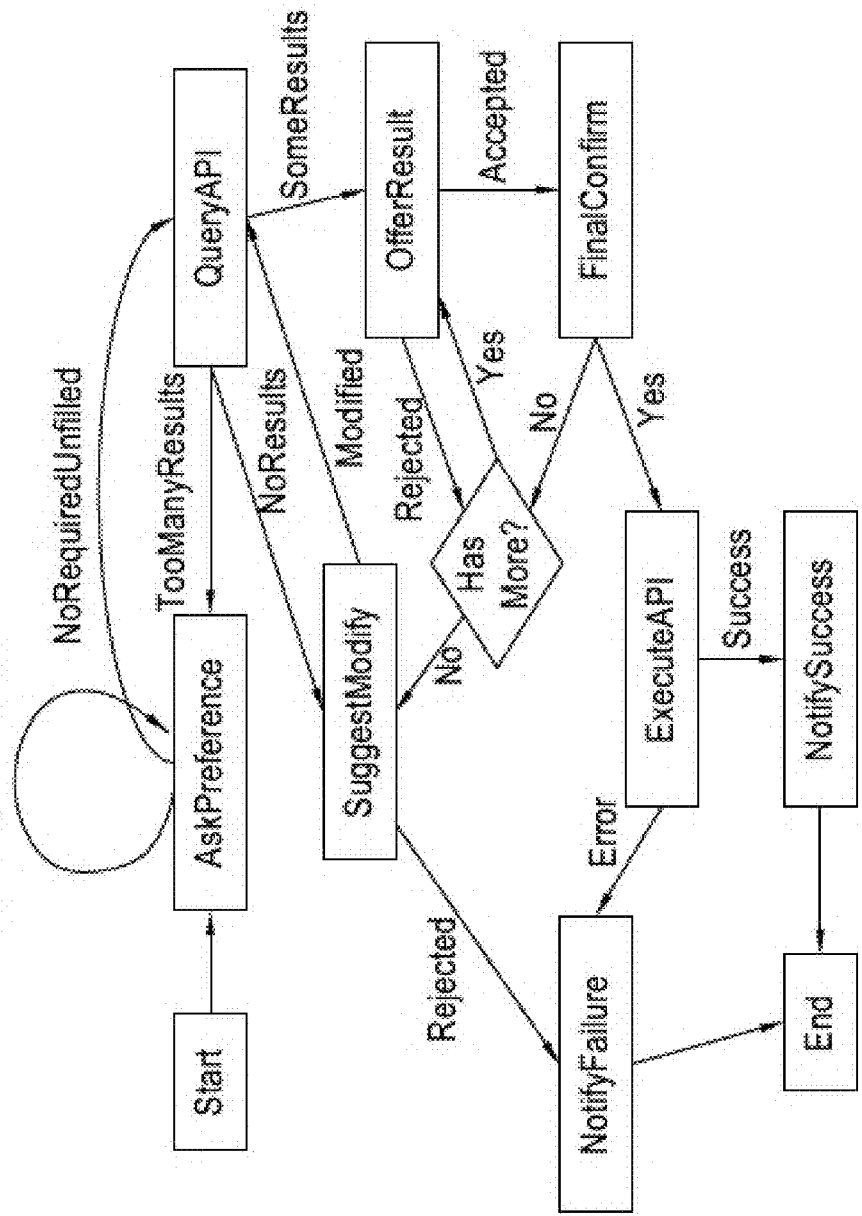
FIG. 10 shows a policy model used in a dialogue method according to an embodiment.

Once the updated belief state is obtained in S203, a dialogue management step is then performed in S204, in which a system act is determined. The updated belief state is taken as input. Other information may also be extracted from the input utterance and inputted to the dialogue management model. In this step an appropriate system response is selected following the latest user utterance. The dialogue manager uses the updated belief state to determine the system act, which is the dialogue act representation of the dialogue system's response to the user utterance. The terms dialogue management and dialogue policy model are used interchangeably in this specification. The dialogue management in step S204 may be performed using a rule based approach or a learning-based method such as reinforcement learning and supervised learning. Examples are described below in relation to FIGS. 10 to 12.

The system and user dialogue acts comprise one or more dialogue act types. Dialogue act types correspond to the general action of the utterance. A set of pre-defined dialogue act types are used to generate the system dialogue acts. Each dialogue act type has a corresponding dialogue act argument. The argument may be empty, for example where the act type is "greeting". In task-based systems, the argument may be one or more slot-value pairs. For request acts, the dialogue act argument may be an attribute of an entity. Examples of dialogue acts include inform(food=British) or request(address). The chosen act is then run through a Natural Language Generation (NLG) module to construct and output the system utterance from the dialogue act in S205. Thus in S205, a natural language generation step is performed to generate a textual response based on the system action. In this step, a natural language generation process is performed. For example, stored utterances mapped to dialogue acts or actions may be used to convert the dialogue acts into natural language text. Alternatively, a data driven trained natural language generation module may be used.

The text signal generated in S205 may be directly outputted to the user, or may be converted into an audio speech signal, using a text to speech generation process. In this case, in S206, text to speech generation is performed to generate a speech signal, which is then output to the user as an audio signal. Any type of text to speech generation process may be used in this step. This step may alternatively be omitted, and the text signal output directly to the user, on a screen for example. Operating with text output can also allow hearing impaired people to use the system for example.

Figure 3:
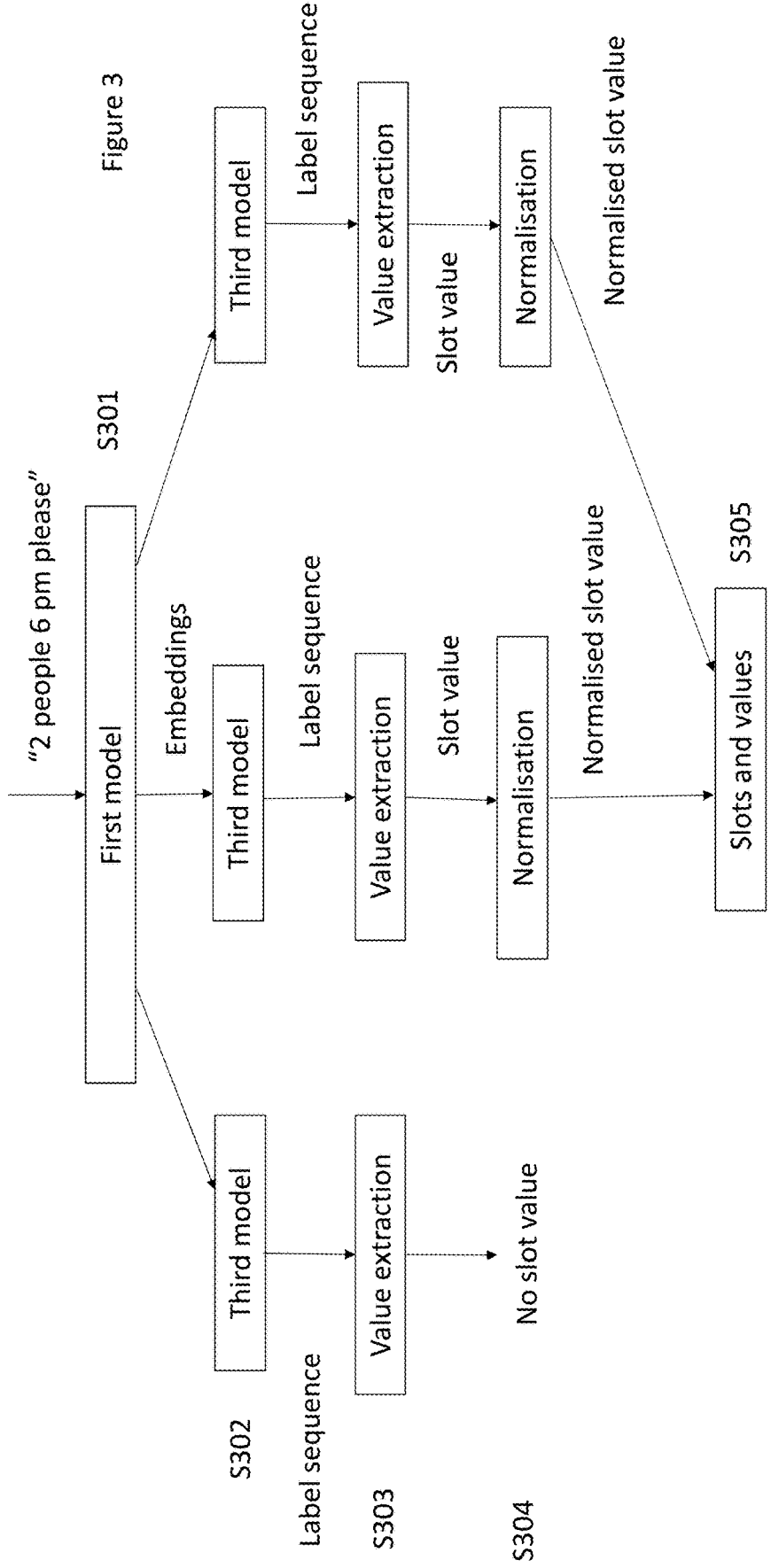
FIG. 3 shows a flow chart illustrating a language understanding method used in a dialogue method according to an embodiment.
Figure 4B:
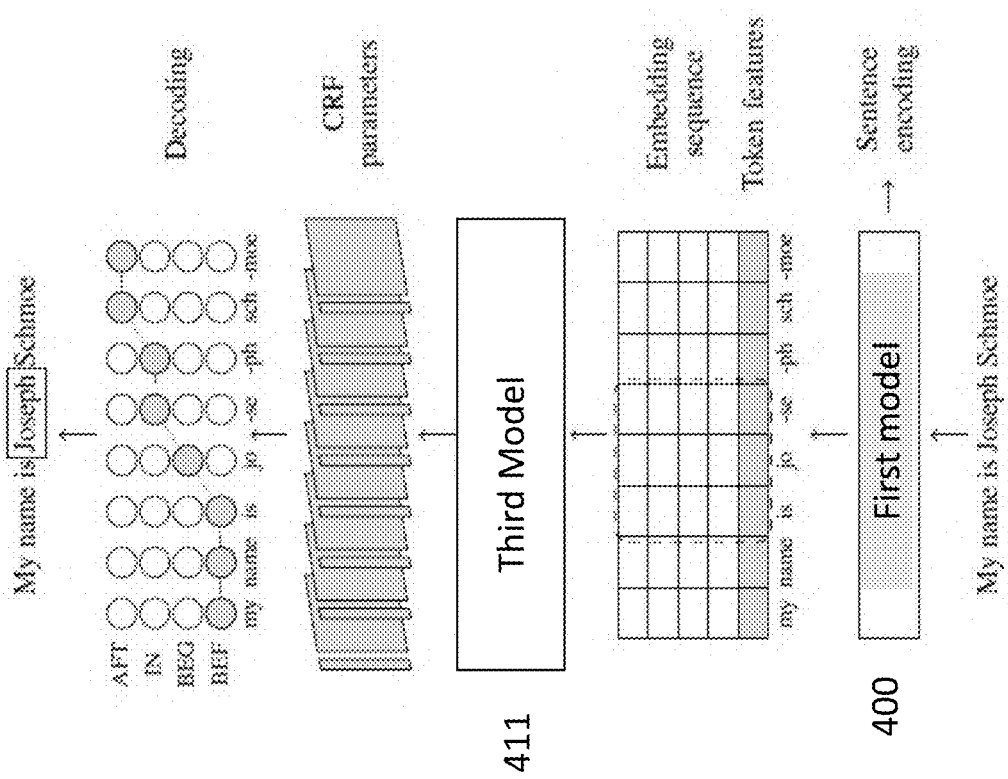
FIG. 4(*a*) is a schematic illustration of a value extractor model used in the method of FIG. 3.

FIG. 3 shows a flow chart illustrating a spoken language understanding method used in a dialogue method according to an embodiment. This method may be performed in S203 as described above. FIG. 4(a) is a schematic illustration of the value extractor model 109, comprising a first model 400 and a third model 409, used in the method of FIG. 3. FIG. 4(b) shows the inputs and outputs at various stages of the method of FIG. 3 (with a different input example to FIG. 4(a)).

A text signal is inputted. The text corresponds to a turn in a dialogue. As described above, a text signal may be directly input by a user, or the text signal is generated from an input audio signal using an automatic speech recognition method. The input signal may be "2 people 6 pm please" for example.

Figure 5A:
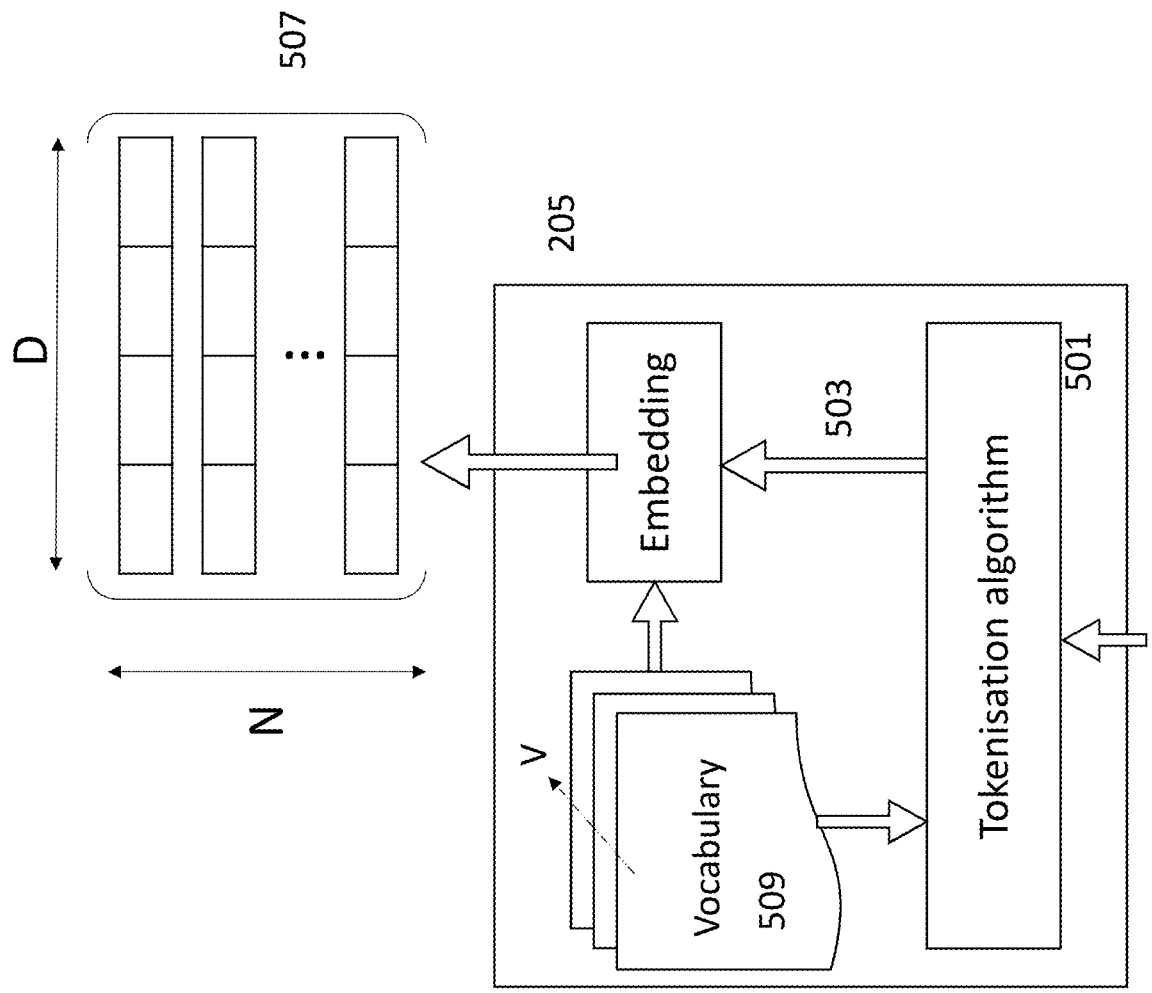
FIG. 5(*a*) shows an example of a first part of a first model used in a method according to an embodiment.

In step S301, the text signal is taken as input to a first model 400. The first model 400 encodes the text sequence. The first model 400 represents the text input as a sequence of vector representations, also referred to here as embeddings. Each embedding is vector having a dimension D. In an embodiment, the dimension is 512. An example of a first model 400 is described in relation to FIGS. 5 and 6. Various other models may alternatively be used to generate the vector represenations however.

Each embedding corresponds to a token. In this example, the token may be a sub-word, as will be described in more detail in relation to FIGS. 5 and 6 below. The tokens are also referred to as units throughout.

As shown in FIG. 4(a), a text signal, in this case "2 people 6 pm please", is taken as input to the first model 400. A set of embeddings is generated, in this example, 5 embeddings are generated: a first embedding corresponding to "2", a second embedding corresponding to "people", a third embedding corresponding to "6", a fourth embedding corresponding to "pm" and a fifth embedding corresponding to "please". A fixed number of embeddings T is generated for each input, where the first model 400 performs truncation or padding/masking as will be described below. Each embedding is a D dimensional vector. T embeddings are generated. The output sequence of embeddings is taken as input to a plurality of third models 409.

In this example, the value extractor model 109 comprises multiple third models 409, where each third model 409 corresponds to a different slot. The third models 409 will be described in more detail below. For clarity, in FIGS. 4(a) and (b), only a single third model 409 is shown. However, it is to be understood that the output of the first model 400 shown in these figures may be inputted to multiple third models 409 in the same manner shown, and as illustrated in FIG. 3. For each turn, the SLU module, comprising the value extractor model 109, can output more than one (slot, value) pair. In the example shown in FIG. 3, two of the third models 409 return values for the input.

A third model 409 is run for each slot, checking if a value for this slot has been mentioned in the current utterance. For example, the input utterance "2 people for 6 pm please" comprises a value for the slot "party size" (two) and a value for the slot "time" (6 pm). A set of slot-specific third models 409 all share the parameters of the encoder (the first model 400). This way, extraction of more than one (slot, value) pair from each utterance is enabled, with a reduced memory footprint. A shared set of first model 400 parameters, which constitutes the majority of parameters, are used for all slot-specific labellers, i.e. for all third models 409. For example, in a restaurant booking scenario, this may mean five different slot labelers (third models 409), all supported by the same encoder (first model 400).

For some domains, additional context features such as a binary "slot is requested" feature can be incorporated. In this way, turn-by-turn context may be explicitly captured by adding an input feature denoting whether the slot corresponding to the third model 409 was requested for this dialogue turn. An optional residual layer 402 in the third model 409 that computes a term to add to the output encoding, given the encoding itself and the additional features, is included. Other binary features may additionally or alternatively be added to emphasize important textual characteristics such as: whether the token is alphanumeric; whether the token is numeric; and/or whether the token is the start of a new word. Optionally, the character length of the token may be included as an integer feature.

The residual layer 402 updates the embeddings output from the first model 400 for each token i:

$$x_i \rightarrow \text{fast\_gelu}(f(x_i, \text{features}_i) + x_i)$$

where features$_i$ comprises one or more of the following features:
whether $x_i$ is fully alphanumeric (not a punctuation token)—0 or 1
whether $x_i$ i is fully numeric—0 or 1
whether $x_i$ is the start of a new word—0 or 1
the number of bytes in $x_i$—1, 2, 3, . . .
the 'slot is requested' feature—0 or 1 and constant for all $x_i$ in a given input utterance.

In this example, the function $f(x_i, \text{features}_i)$ is a 4-layer FFN and a linear projection. The input is the concatenation of the vector representation of the token $x_i$ with the features. If there are all five features listed above included, and the vector representation is a 512 dimensional vector, the input to the residual layer is thus a 512+5=517 dimensional vector. In this example, the 4 layers have size 1024, and use the fast gelu activation function. These are followed by a linear projection back to 512 dimensionality, for the element-wise addition with the original $x_i$ representations.

The 'slot is requested' feature enables the value extractor 109 to distinguish between (how many people? 7) and (at what time? 7) for example. Thus if the requested slot in the previous system output was "how many people", then the "slot is requested" feature for the third model 409 corresponding to the "people" slot will be set to 1 for all tokens, whereas the "slot is requested" feature for the third model 409 corresponding to the "time" slot will be set to 0 for all tokens. In this way, the third model 409 for the "people" slot should return a value (7), whereas the third model 409 for the "time" slot should return no value (since the third models 409 have learned to distinguish based on the "slot is requested" feature).

The other features were also shown to improve performance for various use cases. Using the residual structure, i.e. the element-wise addition with the original $x_i$ representations, means that including these additional features does not reduce performance, since there is a clear path for the network to ignore them.

The embeddings are taken as input to an input feed forward network 404 and also as input to a template feed forward network 406 in the third model 409. These project the embeddings down to lower dimensional embeddings, which will be referred to as d-dimensional embeddings. For example, where the output embeddings are 512-dimensional output representations, these may be projected down to a first set of 128-dimensional representations using the input feed-forward network (FFN) and projected down to a second set of 128-dimensional representations using the template feed-forward network (FFN). Each embedding output from the previous layer is taken as input to the input FFN 404 and the template FFN 404 in turn, and a sequence of reduced dimension embeddings is output from each of the input FFN 404 and the template FFN 406. In this example, there are 5 D-dimensional embeddings, and therefore the input FFN 404 outputs a first set of 5 d-dimensional embeddings and the template FFN 406 outputs a second set of 5 d-dimensional embeddings. In the example described herein, the input FFN 404 and the template FFN 406 each comprise a single layer, with an input size of 512 and an output size of 128. The neural network layers use a Fast GELU approximation activation function. The input FFN 404 outputs a first sequence of first vector representations, each representing a unit of the input data. The template FFN 406 outputs a second sequence of second vector representations, each vector representing one of the units of the input data.

The third model 409 further comprises a second model 411. The second model 411 determines a tag sequence from the first sequence of first representations output from the input FFN 404. The second model 411 comprises an attention layer using the second sequence of second representations. The tag sequence comprises one or more tags from a set of tags, wherein the set of tags comprises BEFORE, BEGIN, INSIDE and AFTER in this example. The BEFORE tag tags a part of the input utterance before the slot value. The BEGIN and INSIDE tags tag the slot value. The AFTER tag tags a part after the slot value. The second model 411 is a sequential decoder. The tag labels label the sequence in order, such that the first one or more tokens are tagged BEFORE (if present), the next one or more tokens are tagged BEGIN (if present), the next one or more tokens are tagged INSIDE (if present) and the last one or more tokens are tagged AFTER (if present), where one or more tags may not be present for a given sequence. Each of the tags tags a continuous sequence of one or more tokens only.

The second model 411 comprises a repeating decoder block 408. The first sequence of d-dimensional embeddings output from the input FFN 404 is taken as input to the repeating block 408. In the example shown, the repeating block 408 comprises: a block of self-attention 412, a block of attention over the second sequence of d-dimensional embeddings 414, and an FFN layer 416. These layers are repeated, such that the second model 411 comprises a second set of these layers, i.e. a further block of self-attention 412, a further block of attention over the second set of d-dimensional embeddings 414, and a further FFN layer 416. For simplicity, a single block 408 is shown in the figure, with the repetition indicated by "×2". The output sequence of the first block 408 is fed as an input to the second block 408. Here, the projected contextual sub-word representations of the input sentence are enriched using two blocks of self-attention, attention over the projected second sequence of sentence representations, and FFN layers. This provides features for every token in the input sentence.

The attention layers comprise scaled dot-product attention units, such that attention weights are calculated between every token simultaneously. The attention layers produce embeddings for every token. The embeddings comprise information about the token itself as well as a weighted combination of other relevant tokens, weighted by the attention weights. Using a self-attention based model 408 allows long-range dependencies in the input sequence to be captured in a computationally efficient manner, since the sequence is processed as a whole.

The self-attention layer 412 comprises three stored matrices of weights, where the weights are trainable parameters of the third model 409. The matrices may be referred to as the "first query weight matrix" $W_{Q1}$, the "first key weight matrix" $W_{K1}$ and the "first value weight matrix" $W_{V1}$. Each matrix has a number of rows equal to the embedding length d. The number of columns may be selected as a hyperparameter. In an embodiment, each matrix has dimension d×d. In another example, when d=128, each matrix has dimension 128×64. The sequence of embeddings input to the block is combined to form an input matrix, where each embedding forms a row of the input matrix. The input matrix $X_1$ has a number of rows equal to the number of embeddings in the input sequence, T, and a number of columns equal to d. The matrix product of the input matrix with each of the weight matrices is taken, resulting in three output matrices, the first query matrix $Q_1$, the first key matrix $K_1$ and the first value matrix $V_1$ (where $Q_1=X_1W_{Q1}$, $K_1=X_1W_{K1}$ and $V_1=X_1W_{V1}$). Each of the first query matrix, first key matrix and the first value matrix has a number of rows equal to the number of embeddings in the input sequence, and a number of columns equal to the number of columns of the weight matrices, which in an embodiment may be set to d.

The output of the self attention layer is then calculated. The output is a matrix $O_1$, which is calculated by the following matrix calculation:

$$O_1 = softmax\left\{\frac{Q_1 K_1^T}{c_1}\right\}V_1$$

where c is a constant. In an embodiment, $c_1$ is equal to the square root of the number of columns of the key weight matrix. In an example, when each matrix $W_{Q1}$, $W_{K1}$ or $W_{V1}$ has dimension 128×64, $c_1=\sqrt{64}$. The softmax operation normalizes the values. The output matrix $O_1$ has the same number of rows as the input matrix, T, and the number of columns is equal to the number of columns of the weight matrices. In an embodiment, the output matrix also has the same number of columns as the input matrix, d. Thus $O_1$ is an T×d matrix. The self-attention layer 412 allows the model to incorporate a representation of other units in the sequence into the encoding of the current unit. The self-attention attends over the input (itself).

The output matrix $O_1$ is input to a first layer-normalization step 413, in which it is summed with the input matrix $X_1$, and a layer-norm operation applied to the resulting matrix. An output matrix $X_2$ is output, which is an T×d matrix.

The attention layer 414 comprises a further three stored matrices of weights, where the weights are further trainable parameters of the third model 408. The matrices may be referred to as the "second query weight matrix" $W_{Q2}$, the "second key weight matrix" $W_{K2}$ and the "second value weight matrix" $W_{V2}$. Each matrix has a number of rows equal to d, the number of columns of the matrix $X_2$. The number of columns may be selected as a hyperparameter. In an example, each matrix has dimension d×d. In another example, when d=128, each matrix has dimension 128×64. The matrix product of the matrix $X_2$ with each of the weight matrices $W_{K2}$ and $W_{V2}$ is taken. The second sequence of vector representations output from the template FFN 406 is combined to form a template matrix $X_T$, where each vector forms a row of the template matrix. The template matrix $X_T$ has a number of rows equal to the number of vector representations in the input sequence, T, and a number of columns equal to d. The matrix product of the matrix $X_T$ with the query weight matrix $W_{Q2}$ is taken. This results in three output matrices altogether, the second query matrix $Q_2$, the second key matrix $K_2$ and the second value matrix $V_2$ (where $Q_2=X_TW_{Q2}$, $K_2=X_2W_{K2}$ and $V_2=X_2W_{V2}$). Each of the second query matrix, second key matrix and the second value matrix has a number of rows equal to the number of rows in the input sequence T, and a number of columns equal to the number of columns of the weight matrices, which may be set to d or may be set to 16 for example.

The output of the attention layer 414 is then calculated. The output is a matrix $O_2$, which is calculated by the following matrix calculation:

$$O_2 = softmax\left\{\frac{Q_2 K_2^T}{c_2}\right\}V_2$$

where $c_2$ is a constant. In an embodiment, $c_2$ is equal to the square root of the number of columns of the key weight matrix. In an example, when each matrix $W_{Q2}$, $W_{K2}$ or $W_{V2}$ has dimension 128×64, $c_2=\sqrt{64}$. The softmax operation normalizes the values. The output matrix $O_2$ has the same number of rows as the input matrix, T, and the number of columns is equal to the number of columns of the weight matrices. In an embodiment, the output matrix also has the same number of columns as the input matrix, d. Thus $O_2$ is an T×d matrix. During inference, the attention layer 414 effectively acts like an additional self-attention layer. The template sentence is used as the target sentence, and the attention attends over the template sentence using the input sentence as the source sentence for attention. In the attention layer, query weight matrix $W_{Q2}$ is associated with the template sentence, the other two matrices $W_{K2}$ and $W_{V2}$ are associated with the input sentence. This input-template attention uses only one attention head in this example.

The output matrix $O_2$ is input to a second layer-normalization step 415, in which it is summed with the matrix $X_2$, and a layer-norm operation applied to the resulting matrix. Each row of the output matrix $X_3$ is then fed into a feed forward neural network 416 sequentially.

The feed forward neural network 416 is a fully-connected feed-forward network (FFN) which is applied to each input vector separately and identically. In this example, the FFN 416 comprises two linear transformations with a Fast GELU approximation activation in between. The dimensionality of the input of the FFN is d. The dimensionality of the hidden layer and output is 256.

A further layer-normalisation step 417 is then performed to the output of the feed forward neural network 416, and the sequence of vectors is taken as input to the second repeated block 408, which comprises the same layers as described above.

The repeating block 408 is part of a sequential decoder 411. Once the input sequence is encoded via the first model 400, the decoder 411 decodes the correct labels from the encoded sequence. The entire value extractor model 109 comprises a sequence-to-sequence (or encoder-decoder) structure.

As described above, a set of D dimensional template sentence subword representations, $z_1, z_2, \ldots, z_n$ are input to the template FFN 406 and the same set of D dimensional input sentence subword representations $x_1, x_2, \ldots, x_m$ are input to the input FFN 404, where n=m, and where D=512 in this example. The FFNs 404 and 406 have hidden layers [512, 128] in this example, bringing the dimensionality down to 128. This scales down the number of parameters in the later layers. These layers use fast gelu activation, and the models further comprise layer normalisation. The updated input representations ($x_i$) are output from the FFN 404 with dimension 128, and the updated template representations $z_i$ are output from the FFN 406 with dimension 128.

A repeating block 408 comprising the following layers follows. A self attention layer 412 operates on the ($x_i$). This is single-headed, using a projection to 16-dims for comparing queries and keys. This produces new representations ($x'_i$). A layer normalisation 413 is then performed such that $x_i \rightarrow \text{layernorm}(x_i + x'_i)$. The attention 414 over ($z_i$) operates on the ($x_i$), again using 16 dimensional projection. This produces new representations ($x'_i$). A layer normalisation 415 is then performed such that $x_i \rightarrow \text{layernorm}(x_i + x'_i)$. Finally, new representations $x'_i \rightarrow W_2 \text{fast\_gelu}(W_1 \cdot x_i)$, where $W_1$ is a weights matrix going up to 256 dims, and $W_2$ brings back down to 128 dimensions are generated by FFN layer 416. A layer normalisation 417 is then performed such that $x_i \rightarrow \text{layernorm}(x_i + x'_i)$. CRF transition parameters and unary scores are then computed using dense linear layers on each $x_i$, as will be described below.

The second model further comprises a CRF layer 410. The vectors output for the second repeated block 408, i.e. a sequence of T d-dimensional vectors, is then taken as input to the CRF layer 410, which is a linear layer which computes Conditional Random Field (CRF) parameters for tagging the value span using the four tags: BEFORE, BEGIN, INSIDE, and AFTER. Spans are represented using a sequence of tags, indicating which members of the subword token sequence are in the span. The distribution of the tag sequence is modelled with a CRF, whose parameters are predicted by the second model 411 that runs over the contextualized subword embeddings output from the input FFN 404. Each span comprises a continuous sequence of units, with the spans ordered BEFORE, BEGIN, INSIDE, AFTER. For a given utterance and slot, one or more spans may not be present. For example, if the slot value is at the start of the utterance, then none of the tokens should be tagged BEFORE.

For each step t in the sequence of T vectors, corresponding to a subword token in the input sentence, the network outputs a 4×4 matrix of transition scores $W_t$ and a 4-dimensional vector of unary potentials $u_t$. Each entry in the vector $u_t$ corresponds to one of the four tags for the position t:

|        |             |
|--------|-------------|
| BEFORE | $u_{BF}$    |
| BEGIN  | $u_{BE}$    |
| INSIDE | $u_I$       |
| AFTER  | $u_A$       |

Each row in the matrix $W_t$ corresponds to one of the four tags for the position t, and each column corresponds to one of the four tags for the position t+1 in the sequence:

|        | BEFORE | BEGIN | INSIDE | AFTER |
|--------|--------|-------|--------|-------|
| BEFORE | $W_{BFBF}$ | $W_{BFBE}$ | $W_{BFI}$ | $W_{BFA}$ |
| BEGIN  | $Wu_{BEBF}$ | $W_{BEBE}$ | $W_{BEI}$ | $W_{BEA}$ |
| INSIDE | $W_{IBF}$ | $W_{IBE}$ | $W_{II}$ | $W_{IA}$ |
| AFTER  | $W_{ABF}$ | $W_{ABE}$ | $W_{AI}$ | $W_{AA}$ |

In practice, the final linear layer may output a 20-dimensional vector for each time step, which is then re-arranged into the W matrix and u vector for the time step. The tags BEFORE, BEGIN, INSIDE, and AFTER correspond respectively to: the part of the phrase prior to the slot value, the token at the beginning of the slot value, the part of the phrase corresponding to the rest of the slot value, and the part of the phrase after the slot value. Although an example in which four tags are used is described here, alternatively three tags or five tags could be used for example.

Each subword unit t in the sequence is tagged with one of the tags, such that the value can be identified as corresponding to the subword units tagged "BEGIN" and "INSIDE". The correct sequence of t tags is identified by calculating the probability of each possible sequence of t tags, and selecting the sequence having the highest probability. The probability of a particular sequence y given an input v is calculated from the following relation:

$$p(y|v) \propto \prod_{t=1}^{T-1} \exp(W_t | y_{t+1}, y_t) \prod_{t=1}^{T} \exp(u_t | y_t)$$

where $y_t$ is the tag of the sequence at the position t. Thus to determine a probability for a sequence in which the tag for the first subword unit is BEFORE, the tag for the second subword unit is BEFORE, and the tag for the third subword unit is BEGIN, the value $W_1$ used in the calculation is the value in the matrix $W_1$ corresponding to row 1 and column 1, and the value of $u_1$ is the value in the vector $u_1$ for row 1. The value $W_2$ is the value in the matrix $W_2$ corresponding to row 1 and column 2, and the value of $u_2$ is the value in the vector $u_2$ for row 1. The relation gives the probability of a predicted tag sequence under the CRF model. The top scoring sequence, i.e. the sequence of tags with the highest probability, is then determined and output.

This approach to sequence tagging is a linear chain conditional random fields (CRF) based approach. The linear chain CRF model predicts a label for each unit in the sequence whilst considering the neighbouring unit. The prediction is modelled as a graphical model, which implements dependencies between the predictions. A linear chain CRF implements sequential dependencies in the predictions. The second model 411 estimates the CRF parameters, which model the predictions for the sequence. The CRF parameters comprise a 4×4 matrix of transition scores $W_t$ and a 4-dimensional vector of unary potentials $u_t$ for each unit in the sequence. The 4-dimensional vector of unary potentials $u_t$ represents a likelihood of each tag for the unit. The 4×4 matrix of transition scores $W_t$ represents a likelihood of each tag for the unit combined with each tag for the following unit. Linear chain CRFs are suitable for sequence modelling. In the present case, given the input first sequence of first representations, the CRF models the predicted span tags for the sequence. By formulating the task of value extraction as a span labelling/extraction problem, a CRF based model may be used. Using a linear-chain CRF model further reduces the number of parameters for the final CRF layer 410. The top scoring sequence, i.e. the sequence of tags with the highest probability, may be calculated using the Viterbi algorithm for example. An example method of how a sequence may be determined from the CRF parameters is also provided in "An Introduction to Conditional Random Fields", Charles Sutton and Andrew McCallum. Foundations and Trends in Machine Learning 4(4), 17 Nov. 2010, arXiv:1011.4088v1, the entire contents of which are incorporated herein by reference.

In the above described example, the input and template sequences are combined using the repeated attention layer 414. However, various other options for combining the sequence pairs may be used. For example, only a single attention layer 414 or more than two attention layers 414 may be used. One or more multi-headed attention layers may additionally or alternatively be used. Alternatively, the two sequences may be combined by a linear or non-linear mapping using an FFN layer taking the concatenated representations as input and mapping to another joint representation. Alternatively, the vector representations from the input and template sequences may simply be concatenated without learning any mapping.

Furthermore, a specific decoder structure is described in the above example. However, various modifications to this structure may be made, for example including more or fewer repeating blocks or additional FFN layers.

As shown in FIG. 4(b), the output of the second model 411 comprises a sequence of tags corresponding to each token in the input text signal. As described above, the value extractor model 109 comprises multiple third models 409, each corresponding to a different slot. Each second model 411 therefore outputs a sequence of tags. The parts of the input text signal corresponding to the tags BEGIN and INSIDE are then extracted for each slot. In other words, the parts of the input text signal corresponding to the tokens tagged as corresponding to the slot value are extracted. In the example described here, the BEGIN and INSIDE tokens correspond to the slot value. For slots where the output of the second model 411 contains no tokens labelled BEGIN or INSIDE, no value is extracted for the slot for the turn.

The extracted part of the input phrase for each slot is then normalized to a slot value in S304. This can be performed using a rule-based system. For example, for cases such as times, dates, and party sizes, a hierarchical rule-based parsing engines, for example Duckling, may allow for parsing times and dates such as "the day after next Tuesday". Further, phrases such as "Me and my wife and 2 kids" can be parsed using singular noun and number counts in the span.

Once a slot value is extracted, this is paired with the slot, resulting in a slot value pair, which is then input to the dialogue state tracker step S203 as described above. Thus for each third model 409 which returns a value, the value is paired with the slot corresponding to the model, and the set of slot value pairs output. The probability calculated in S303 may also be output as the probability of the slot value, and this taken as input to S203.

The weights and biases of the first input FFN 404, second template FFN 406, self-attention layer 412, attention layer 414, further FFN layer 416 and final linear layer 410 are the trainable parameters of the third model 409. The values of these parameters, together with the trainable parameters of the first model 400 are learned during a training process, which will now be described below.

The training process described herein comprises two stages, a pre-training stage and a fine-tuning stage. Alternatively however, the first model 400 and the third model 409 may be trained using the pre-training process only, or the fine-tuning process only.

Figure 7:
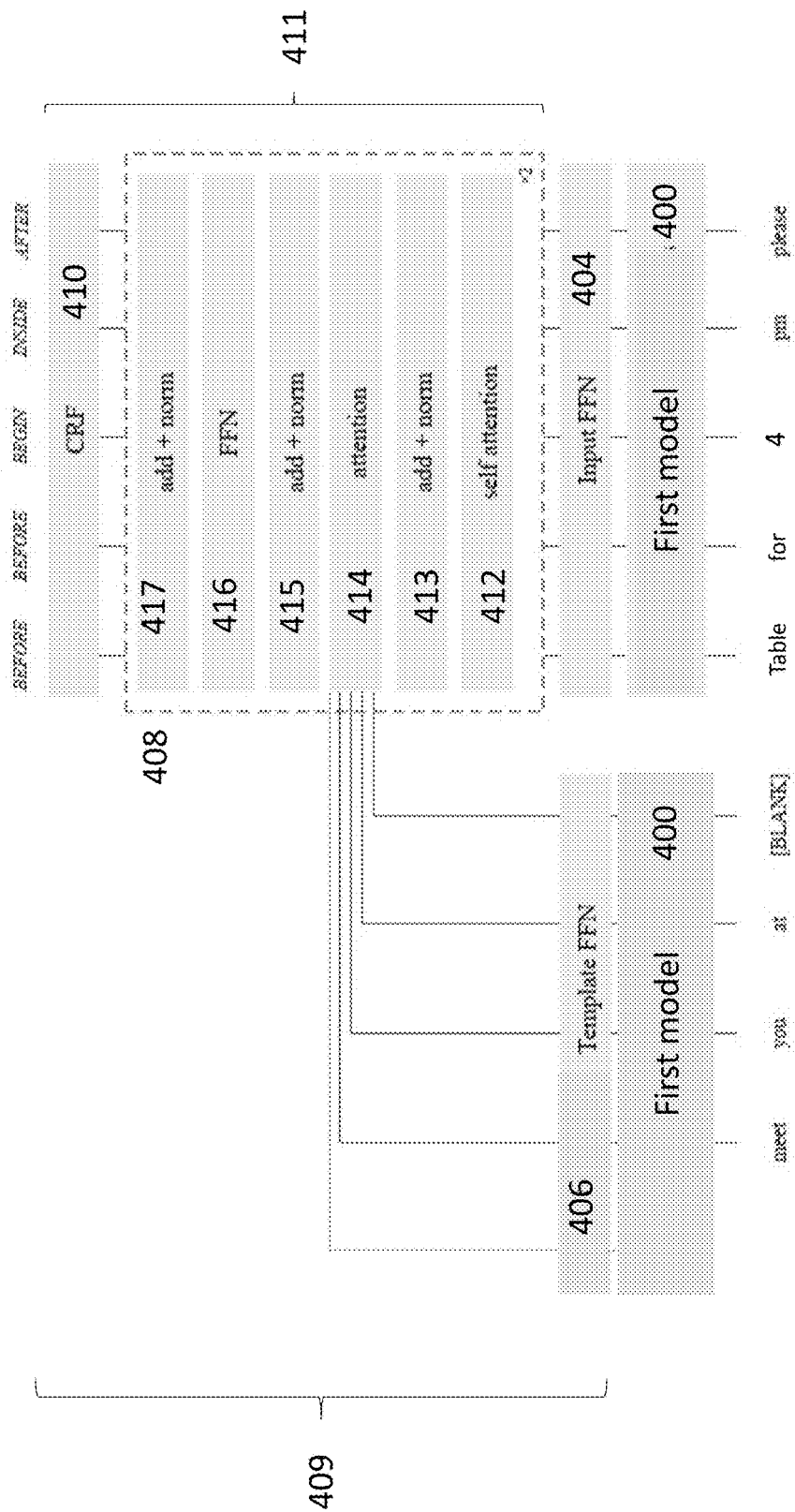
FIG. 7 shows a schematic illustration of a method of training according to an embodiment.

The pre-training stage will be described in relation to FIG. 7. FIG. 7 shows a schematic illustration of a method of training according to an embodiment.

Figure 9:
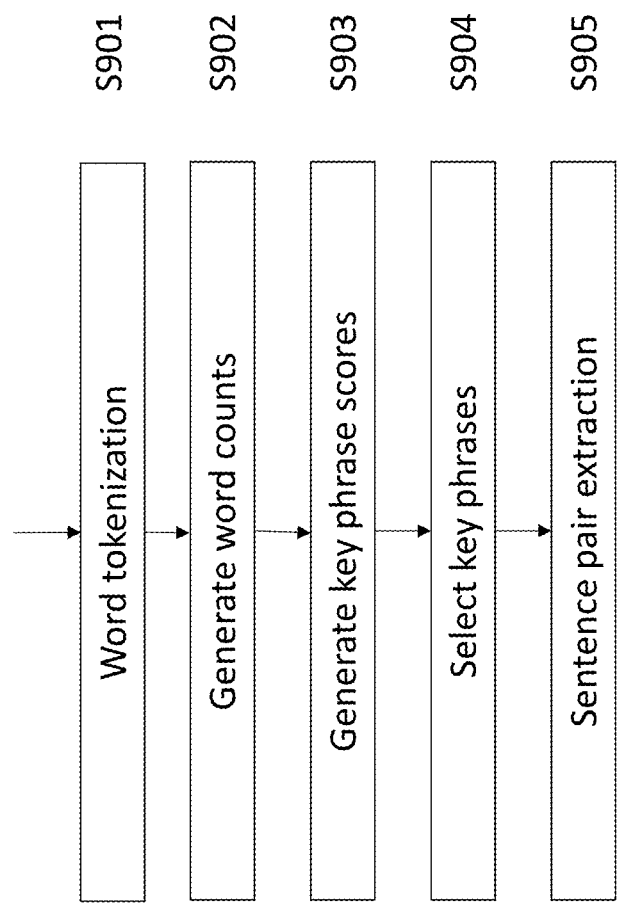
FIG. 9 shows a schematic illustration of a process of generating data according to an embodiment.

Prior to conducting the pre-training stage, a process of generating the pre-training stage training data is performed. FIG. 9 shows a schematic illustration of a process of generating data according to an embodiment. This method may be performed prior to the method of FIG. 7, and the data generated from this method used in the training process of FIG. 7.

A corpus of text data comprising a large number of phrases is taken as the starting point. This data need not be specific to the intended domain of the final dialogue system. Rather, a general corpus of natural language data may be used. In this description, an example based on an English language dialogue module is described, and therefore English language text data is used. However, the dialogue system may be adapted for use in various languages. A dataset comprising text comments may be used in this stage. Since it is possible to use a corpus of data not specific to the intended domain, generally a larger dataset may be obtained. For example, a dataset of the order of 2 billion phrases may be used. This corpus of text data is unlabelled.

Keyphrase identification is then performed on the entire dataset, in which plausible candidate keyphrases are identified.

In step S901, the sentences in the dataset are tokenized with a simple word tokenizer, such that each word in each sentence of the dataset corresponds to a token. In S902, word frequencies are then counted. Thus for each word, the number of occurrences in the dataset is counted.

In S903, for each sentence in the data set, a score is calculated for all unigrams, bigrams and trigrams in the sentence, from the word frequencies. These are the candidate keyphrases. A score of a candidate keyphrase comprising multiple words $(w_1, w_2, \ldots, w_n)$ is computed as a function of the individual word counts:

$$\left(\prod_{i=1}^{n} \text{count}(w_i)\right)^{\frac{1}{n^{\alpha}}}$$

In practice a log score is easier to compute and may be used. All possible unigrams, bigrams and trigrams are scored. If unigrams and bigrams which are part of a trigram that scores above the threshold also satisfy the criterion, the longest key phrase (i.e., the trigram) is extracted. The same holds for unigrams found inside bigrams.

This simple scoring function is then used to select phrases that have informative low-frequency words. The word count count$(w_i)$ in the above relation is simply word frequency. The actual keyphrase extraction is based on the above formula controlled by word frequency and the parameter alpha. In this example, n=3. The factor α controls the length of the identified keyphrases. For example, setting α=0.8 encourages selecting longer phrases. In S904, for each sentence, the keyphrases are selected as those unigrams, bigrams and trigrams whose score exceeds a predefined threshold. The keyphrase identification procedure is run for all sentences from the dataset. At most two keyphrases are extracted per sentence, and keyphrases spanning more than 50% of the sentence text are ignored. Keyphrases that occur more than once in the sentence are also ignored.

In S905, sentences are paired by keyphrase to create paired data, where one sentence is allocated as the input sentence and the other as the template sentence. Sentence-pair value extraction examples are extracted from unlabelled text based on their shared keyphrases. Thus a sentence pair comprises two sentences, each comprising the same key phrase. One of the sentences is assigned as the template sentence, and the other as the input sentence. Various approaches may be used to locate sentences with similar key phrases more quickly, for example searching for sentences from a sub-set of the data corresponding to a single topic or thread.

Optionally, keyphrases inside paired sentences are expanded if there is additional text on either side of the keyphrase that is the same in both sentences. For instance, the original keyphrase "Star Wars" will be expanded to the keyphrase "Star Wars movie" if the following sentences constitute a pair: "I really enjoyed the latest Star Wars movie."—"We could not stand any Star Wars movie."

Each pair of sentences have a keyphrase in common. One sentence is treated as a template sentence and the other as its corresponding input sentence. For the template sentence, the key phrase is masked out and replaced with a token reserved for the keyphrase, referred to here as the BLANK token. Some examples of such sentence pairs are provided in Table 1.

TABLE 1

Sample data in which the key phrases in the input sentence are denoted with bold. For the template sentence, the key phrase is masked out and replaced with a special BLANK token.

| Template Sentence | Input Sentence |
| --- | --- |
| Why Puerto Rico? It's Memphis at Dallas, which is in Texas where BLANK hit | Hurricane Harvey. Just a weird coincidence. |
| I took BLANK, cut it to about 2 feet long and duct taped controllers on each end. Works perfect | Yeah, I just duct taped mine to a broom stick. You can only play no arrows mode but it's really fun. |
| I had BLANK and won the last game and ended up with 23/20 and still didn't get it. | I know how you feel my friend and I got 19/20 on the tournament today. |

In the above method, sentence-pair value extraction examples are extracted from unlabelled text based on their shared key phrases.

FIG. 7 shows a schematic illustration of a method of training according to an embodiment, which may be performed using this dataset. Instead of relying on more general pre-training objectives such as language modelling or response selection, the pre-training objective used here is based on a sentence-pair value extraction task. This task is well aligned with the intended usage on sequence-labelling tasks.

Unlike during inference, during the pre-training method, pairs of sentences are taken as input. Each of the input sentence and the template sentence are converted to a sequence of embeddings by the first model 400, in the same manner as described in relation to FIG. 3 above. An input sequence of embeddings is generated by the first model 400 from the input sentence, and a template sequence of embeddings is separately generated by the first model 400 for the template sentence. The weights in the first model 400 are shared for both the input sentence and the template sentence. In the same manner as described in relation to FIG. 3 above, the first model 400 encodes the template and input sentences using an encoder architecture. The first model 400 provides a lightweight sentence encoder. This first model 400 structure is compact and resource-efficient. The first model 400 achieves good performance on a range of conversational tasks. As is described in more detail in relation to FIGS. 5 and 6 below, in this example the input to the training process follows a tokenization process, where the final subword vocabulary contains 31,476 subword tokens plus 1,000 buckets reserved for out-of-vocabulary tokens. Input text is split into subwords following a simple left-to-right greedy prefix matching, and both input sentences and template sentences are tokenized in the same way by the first model 400, as described in relation to FIGS. 5 and 6 below.

In the example shown, the input sentence is "Table for 4 pm please" and the template sentence is "meet you at [BLANK]", where the phrase "4 pm" has been replaced by [BLANK] token in the template sentence. The first model 400 generates a fixed number of embeddings corresponding to the input sentence and corresponding to the template sentence, T. During the pre-training stage, the residual layer 402 is not included. A first part of the input data (in this case 4) corresponds to a first unit (in this case referred to as BLANK) in the template data.

The input set of embeddings corresponding to the input sentence is taken as input to the first input FFN 404. However, unlike during inference, when the input embeddings are also taken as input to the second template FFN 406, during the pre-training process the template embeddings are taken as input to the template FFN 406. The token [BLANK] corresponds to an embedding. The first FFN 404 outputs a first sequence of first representations, each representing a token of the input data and the second template FFN 406 outputs a second sequence of second representations, each representing a token of the template data, including the BLANK token. The first sequence of embeddings output from the first input FFN 404 is taken as input to the second model 411, in the same manner as described above. The second model 411 determines a tag sequence. The attention layer 414 uses the second sequence of second representations output from the template FFN 406.

The second set of vector representations output from the second template FFN 406 in this case is generated from the template sentence, rather than the input sentence. There may be a different number of tokens in the template sequence and the input sequence. However, as will be described in relation to FIGS. 5 and 6 below, the length of the sequence of embeddings output from the first part 205 of the first model 400 and fed into the second part 207 of the first model 400 is truncated or padded to a fixed length (in the example described, 60 units), so that all the input and template sequences are of the same length. Padding masking is also applied to mitigate any effect of the padding on further computations. Various methods of masking out the padding are known and may be used. Masking may be implemented by including indicator variables which denote which parts of the sequence have been padded and which come from the original sequence in a mask tensor. A TensorFlow sequence_mask function may be used for this purpose for example.

The padding/truncating is performed for efficiency reasons, to enable quick matrix multiplication operations to be used.

Attention over the projected template sentence representations is therefore provided at attention layer 414. This provides features for every token in the input sentence that take into account the context of both the input sentence and the template sentence.

As described above, the attention layer 414 comprises scaled dot-product attention units, such that attention weights are calculated between every token in the input sentence and the template sentence simultaneously. The attention layer 414 produces embeddings for every token in the input sentence. The embeddings comprise information about the token itself as well as a weighted combination of other relevant tokens in the template sentence and the input sentence, weighted by the attention weights.

As during inference, the output is the most probable sequence of tags from the set BEFORE, BEGIN, INSIDE, and AFTER corresponding to the sub-word tokens. These are predicted by the second model 411, comprising the sequence-level decoder layers.

The input sentence is automatically labelled with the "true" tag values. The part of the input sentence prior to the identified key phrase is labelled "BEFORE", the part of the input sentence corresponding to the key phrase is labelled "BEGIN" and "INSIDE", and the part of the input sentence after the key phrase is labelled "AFTER". These labels are applied automatically, based solely on the key phrase. The units of the input sentence are each labelled with a true transition score matrix and unary potential vector, i.e. with a value of 1 corresponding to the true tag for the unit and a value of 0 corresponding to the other tags. In this way, "raw" unlabelled natural language data is automatically converted into training examples for the pre-training based on the sentence-pair value extraction task.

All four labels are not always used in all sentences, for example sometimes there might not be a BEFORE label, as in the example "Hurricane Harvey. Just a weird coincidence" above. The labels are applied at the token (unit) level. In the example described herein, the first model 400 uses a vocabulary comprising various sub-words. The labels are therefore applied at the sub-word level. The label "BEGIN" is applied to the first token of the keyphrase only. For example:

"It is hurricane harvey!" corresponds to the tokens [_it, _is, _hurri, cane, _harvey, _!] from the first model 400 vocabulary. The labels are applied [BEFORE, BEFORE, BEGIN, INSIDE, INSIDE, AFTER].

"Name Nikola please" corresponds to the tokens [_name, _niko, la, _please]. The labels are applied [BEFORE, BEGIN, INSIDE, AFTER].

This means that the values can correspond to substrings inside words, if they happen to line up with the subword tokenization. For example, it would be possible for a model to predict the name is "Niko" in the above example. In the training data however, the value spans line up with word boundaries (i.e. boundaries between alphanumeric and non-alphanumeric/string boundary characters). Furthermore, the first model and the residual network used in fine-tuning may incorporate token features that signal whether the token is the start of a new word. This helps reduce instances where the model predicts spans (values) inside words.

The trainable parameters of the first model 400 and the third model 409 are then updated based on the labels. In this way, the second model 411 is trained to identify the first part of the input data as corresponding to the first tag (i.e. the BEGIN and INSIDE tags in this example).

The loss is the negative log-likelihood, which is equal to the negative sum of the transition scores and unary potentials that correspond to the true tag labels, up to a normalization term. An example method of how a linear chain CRF model may be trained is also provided in An Introduction to Conditional Random Fields", Charles Sutton and Andrew McCallum. Foundations and Trends in Machine Learning 4(4), 17 Nov. 2010, arXiv:1011.4088v1, the entire contents of which are incorporated herein by reference.

In the following, θ refers to the trainable parameters of the first model 400 and the third model 409. These parameters are updated during the training process so as to minimise a loss function (or maximise the likelihood).

The parameters are assigned random values initially. The parameters at pre-training are thus randomly initialized. Note that optionally however, some prior training stage may have been applied to the first model 400, meaning that these parameters are not random values at the start of the pre-training. In some examples, for the FFN layers, orthogonal initialisation is used, whereas for the linear layers computing the CRF parameters, the attention and self-attention layers, a Xavier initialisation is used, as described in Glorot and Bengio, "Understanding the difficulty of training deep feed-forward neural networks", in Proceedings of the 13th International Conference on Artificial Intelligence and Statistics (AISTATS) 2010, Chia Laguna Resort, Sardinia, Italy. Volume 9 of JMLR: W&CP, the entire contents of which are incorporated herein by reference.

The value extractor model 109, comprising the first model 400 and the third model 409, is pre-trained on the sentence-pair value extraction data. The parameters are updated by calculating the gradient of the loss ∂L/∂θ and updating θ using the computed gradient. The gradient of the loss with respect to each of the trainable parameters θ of the value extractor model 109 is determined through back-propagation. The gradients are then used to determine the updated parameters, using an optimiser function:

$$\theta = \theta - \mu \frac{\partial L}{\partial \theta}$$

where μ is the learning rate defining how quickly the parameters are updated. A learning rate of 0.3 is used in the example described herein. The update may be performed based on a batch average. For example, the training may proceed in batches of 256 examples, 64 of which are randomly paired sentences where no value should be extracted, and the remaining being paired examples from the training data. This teaches the value extractor model 109 that sometimes no value should be predicted, a scenario frequently encountered with slot labelling. In the example described herein, an AdaDelta optimization algorithm is used with ρ=0:9. Various different optimisers may be used however.

These and the other pre-training hyper-parameters may be varied to improve performance. In this training procedure, a slot value is identified as either a single span of text or entirely absent.

In this process, the second model 411 is trained to read the tokens of both sentences, and predict which tokens in the input sentence constitute the masked phrase in the template sentence. The training method uses a pairwise cloze task. This task involves teaching the second model 411 an implicit space of slot values. This pre-training objective emulates slot labelling in a dialogue system by creating examples from short conversational utterances. The value extractor model 109 learns an implicit universal space of slots and values, where slots are represented as the contexts in which a value might occur.

Optionally, an additional term may be added to the loss function. Thus in addition to the CRF loss described above, an auxiliary dot-product loss term can be added. This term pairs template sentences with the corresponding input sentences. As described further in relation to FIGS. 5 and 6 below, for each sequence fed into the first model 400, a special "beginning of sequence" (BOS) token may be added. This token is then used as the representation of the sentence coming out of the first model 400 in the following. In the following, $f_i^T$ is the d-dimensional encoding of the beginning-of-sentence (BOS) token for the ith template sentence, and $f_i^I$ is the encoding of the BOS token for the ith (corresponding) input sentence. As the encodings are contextual, they can be learned to represent the entire sequence. The auxiliary dot-product loss is then computed as follows:

$$-\sum_{i=1}^{N} C\langle f_i^T, f_i^I \rangle + \sum_{i=1}^{N} \log \sum_{j=1}^{N} e^{C\langle f_i^T, f_j^I \rangle}$$

where $\langle \cdot, \cdot \rangle$ is a cosine-similarity and C is an annealing factor that linearly increases from 0 to $\sqrt{d}$ over the first 10K training batches. N is the batch number. This loss does not necessitate any additional model parameters, and does not significantly increase the computational complexity of the training procedure. Instead of the BOS token, some other representation of the entire sentence may be used, for example mean pooling/averaging over all constituent tokens of the sentence, or representing each word token by the first constituent subword token of that word, and then averaging over the word tokens.

This additional loss term acts to penalise cases where the input and template sentences are semantically dissimilar, which might mean that they share the keyphrase only 'by accident'.

The above described training process may be used as a pre-training process for a value extractor model 109 that can then be further trained for one of a wide spectrum of slot-labelling tasks. The value extractor model 109, comprising the first model 400 and third model 409, is pre-trained on a sentence-pair value extraction task, relying on sentence-pair data. Slot labelling is framed as a span extraction task, where spans are represented using a sequence of tags. These tags indicate which members of the sequence are in the span. An "inside-outside-beginning" format may be used to tag the spans, or parts of speech. In the example described herein, the span is annotated with a sequence from the set of BEFORE, BEGIN, INSIDE and AFTER tags.

In an example described herein, the first model 400 and third model 409 are trained for 18 hours on 12 Tesla K80 GPUs using the process described above. This was found to be sufficient to reach convergence. This pre-training process therefore provides a resource and time efficient training. This also allows for wider experimentation. In particular, the self-attention-based architecture used in 408 provides a resource and time efficient training process. In particular, during training, the backpropagation does not need to be performed sequentially through time steps. The use of subword-level units and the transformer architecture is lightweight compared to a model comprising CNNs or recurrent neural networks for example.

Figure 8:
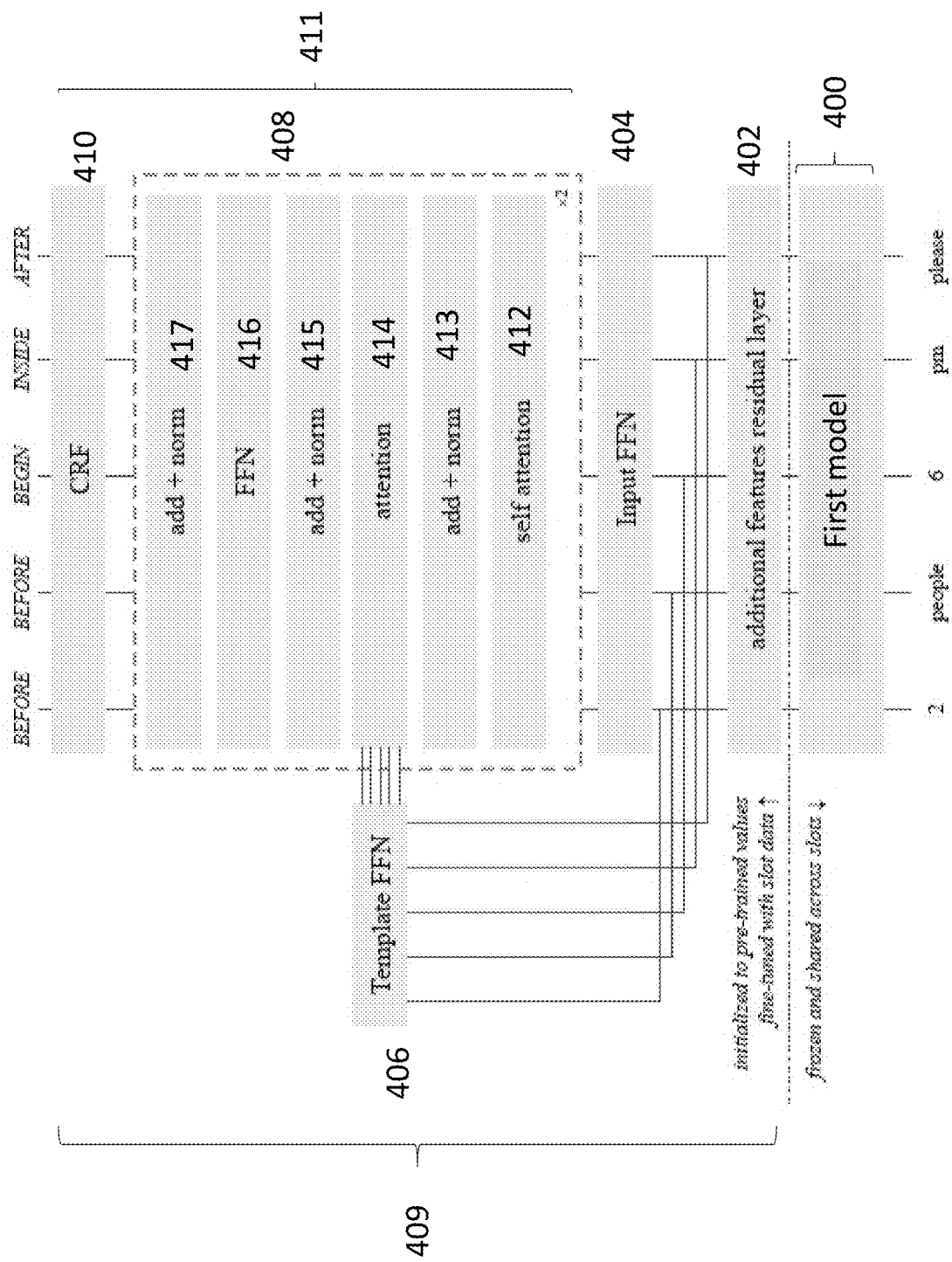
FIG. 8 shows a schematic illustration of a method of training according to an embodiment.

FIG. 8 is a schematic illustration of a method of training according to an embodiment. This method may be performed after the process described in relation to FIG. 7, in order to fine-tune the value extractor model 109 parameters. In this method, multiple copies of the pre-trained third model 409 are fine-tuned, each copy corresponding to a different slot. The third models 409 share the first model 400, the parameters of which are not updated. The majority of the computation and parameters are in the shared encoder layers of the first model 400. In the example described herein, these layers comprise 30M parameters, while the higher-level layers of the third model 409 comprise only 800K parameters. At the fine-tuning stage, the shared encoder layers of the pre-trained first model 400 are frozen. This means that the expensive encoder operations can be shared across slots, while the fine-tuned slot-specific third models 409 are small in memory and fast to run.

A shared set of first model 400 parameters, which constitutes the majority of parameters are used for all slot-specific labelers, i.e. for all third models 409. In the fine-tuning stage, a slot-specific labeler (third model 409) is trained for each slot. For example, in a restaurant booking scenario described above, this may mean five different slot labelers (third models 409), all supported by the same encoder (first model 400).

To apply the value extractor model 109 to slot-labelling for a specific slot, the user utterance is treated both as the input sentence and the template sentence. At the fine-tuning stage and during inference, the user input does not contain any BLANK token. This effectively makes the attention layers 414 in the second model 411 act like additional self-attention layers. A first part of the input utterance corresponds to a slot value for the slot.

In same manner as described above, the input utterance is taken as input to the first model 400, which generates a set of embeddings. As described above in relation to the inference stage, for some domains, additional context features such as the binary "is_requested" feature are incorporated. This is modelled through a residual layer 402 that computes a term to add to the output encoding, given the encoding itself and the additional features. Except for the residual layer 402, no new layers are added between pre-training and fine-tuning. This implies that the model bypasses learning from scratch any potential complicated dynamics related to the application task, and is directly applicable to various slot-labelling scenarios.

The input embeddings are taken as input to the input FFN 404 which generates a first sequence of first representations, and as input to the template FFN 406, which generates a second sequence of second representations. The second model 411 then determines a tag sequence from the first sequence of first representations, where the attention layers 414 use the second sequence of representations in the same manner as during inference.

During the fine-tuning stage, each training example is a dialogue turn annotated with the slots requested by the system and character-based span indexing for all occurring values. The second model 411 is trained to identify the part of the input data labelled as the slot value (i.e. with BEGIN and INSIDE in this example) for each slot as corresponding to the slot value tags. The training examples may be specific to the intended slot in the fine-tuning training stage. The trainable parameters of the third model 409 are updated. The loss is the negative log-likelihood, which is equal to the negative sum of the transition scores and unary potentials that correspond to the true tag labels, up to a normalization term, as described above. A batch size of 64 is used.

The fine-tuning training process may proceed for 4,000 steps of batches of size 64, stopping early if the loss drops below 0.001. Some form of early stopping is included to reduce overfitting on very small data sets.

The training procedure may enforce that exactly 20% of examples in each batch contain a value, and 80% contain no value for example. Further, the batch size is reduced to smaller than 64 in few-shot scenarios, if the training set is too small to meet this ratio without introducing duplicate examples.

The parameters of the transformer layers of the first model 400 are frozen, while the parameters of the third model 409 are initialized to their pre-trained values. In the example described herein, an Adam optimisation algorithm is used for the fine-tuning stage, with a learning rate of 0.001 that decays to $10^{-6}$ over the first 3,500 steps using cosine decay. Adam worked well for training on small amounts of data in a single process, however various other optimisers may be used in this step.

Dropout is applied to the output of the first model 400 layers with a rate of 0.5: it decays to 0 over 4,000 steps also using cosine decay. Dropout is included to reduce overfitting on very small data sets.

In this process, the pre-trained model is fine-tuned to fit domain-specific slot labelling data. By using a pre-training and fine-tuning process, the model can be applied to a wide spectrum of slot-labelling tasks. A light-weight pre-training and fine-tuning neural approach is provided for slot-labelling dialogue tasks. This enables learning domain-specific slot labellers by simply fine-tuning decoding layers of the pre-trained general-purpose model, while the majority of the pre-trained model's parameters are kept frozen.

Only a small number of parameters are fine-tuned, since the pre-training is explicitly performed on a sequence labelling task. For example, this means that at fine-tuning, only approximately 800K parameters of the third model 409 (including the parameters of the final CRF layer 410 plus the sequential decoder 408 parameters) are updated. At fine-tuning a set of slot-specific span extractors share the parameters of the encoder (the first model 400) while only the smaller number of parameters (sequential decoders) is fine-tuned for each slot. The computational complexity of the value extractor model does not scale with the fine-tuning set, only with the number of words in the query sequence.

An example of a first model 400 will now be described. The first model 400 comprises a first part 205 and a second part 207 as shown in FIG. 6(*b*). An example of the first part 205 of the first model 400 is shown in FIG. 5(*a*). Although a specific example of the first model 400 is described, various other models may be used to generate the sequence of vector representations corresponding to the input and template sentences. For example, various encoder based models may be used here.

For a given user input, the first part 205 represents the text input as a sequence of embeddings. Each embedding is a vector having a dimension D. In an embodiment, the dimension is 512.

The first part 205 comprises a tokenisation algorithm 501 that is configured to segment an input text string into a sequence of units, where each unit is contained in the vocabulary 509. Each input text is first converted into a list of units (tokens) by the tokenisation algorithm 501, and these are then represented by stored embeddings corresponding to the units.

The vocabulary 509 comprises a stored database having V units and their corresponding embeddings, as well as K additional embeddings which will be described below. In an example, V may be in the range of 30,000-50,000. In an example, the V is 31,476 units, with K being 1000.

A unit of text corresponds to a sequence of one or more characters. A stored vocabulary comprises a set of units, and the corresponding embeddings. The vocabulary comprises units of text which are "subwords". A subword is an incomplete word. There may also be units corresponding to complete words in the vocabulary. For example, the word "certainly" may comprise the units "_certain" and "-ly". By complete or full words, it is meant that the words are valid English words (or valid words in the language used by the system). For example, the word "develops" can be segmented into_develop and -s (where_develop is a valid English word). Similarly, conversational can be segmented into_conversation and -al. The set of units forming the vocabulary is determined during a "before training" stage, which will be described in further detail below. Complete words that are more frequent in the training data are more likely to be included in the vocabulary. Words such as it, includes, and words may all exist in the vocabulary V, so they are not actually segmented by the tokenisation model during use, i.e. these are tokenized as _it, _includes, and _ words. Rare and out-of-vocabulary words such as mockumentary and flexitarian will be segmented into smaller subword units during use for example. Although the example described here relates to English language, subword tokenisation works well for many languages, and the same methods can be applied to systems based on other languages.

The units (i.e. the string of characters forming the unit) and the corresponding embeddings (the numerical vector of length D) are stored in the storage 107, for example in a look-up table. The vocabulary of units, i.e. the set of units, is learned from data during the initial vocabulary forming stage, and the embeddings corresponding to each unit are learned during the pre-training stage described above in relation to FIG. 7. An input unit query is converted to a sequence of stored units. The units are then replaced with the stored embeddings corresponding to the units.

Using a vocabulary including subword units means that a smaller vocabulary size can be used compared to a word level vocabulary for example. For example, a word level vocabulary may require ~1M words in order to capture a language, whereas a vocabulary including subword units may capture the same number of words using ~40K units, which represents around a ×25 reduction in V. Subword-level tokenization also allows for a simple and straightforward processing of out-of-vocabulary (OOV) words, i.e. words that have not been seen during training. The OOV words are broken down into units which exist in the vocabulary V. For example, the vocabulary may comprise the word "certain", but when the first part 205 encounters the word "certainly", it is able to break it down into the subwords "_certain" and "-ly".

To apply the first part 205 to input text from the user, an algorithm performing parameter-less matching of sequences of characters from the input text, starting from the beginning of the word, to the units in the vocabulary V is used, referred to here as a tokenisation algorithm 501. The tokenisation algorithm 501 is not a trained algorithm and does not use learned parameters. A greedy pattern matching approach may be used, an example of which is explained below. With the greedy pattern matching, there is no need to store further model parameters for the tokenisation algorithm 501. The tokenisation algorithm 501 can be used on any stored vocabulary, i.e. if the vocabulary 509 is changed, the same tokenisation algorithm 501 can be used.

An example of a tokenisation algorithm is the tensor2tensor SubwordTextEncoder module described in Vaswani, Ashish, et al. "Tensor2tensor for neural machine translation." arXiv preprint arXiv:1803.07416 (2018), the contents of which are incorporated herein by reference. An example of such an algorithm is given at <https://github.com/tensorflow/tensor2tensor/blob/df4a50be8db63-d36-bb2391e1adc04558c0e8e1c9/tensor2tensor/data_generators/text_encoder.py#L400>, the contents of which are incorporated herein by reference.

Figure 5B:
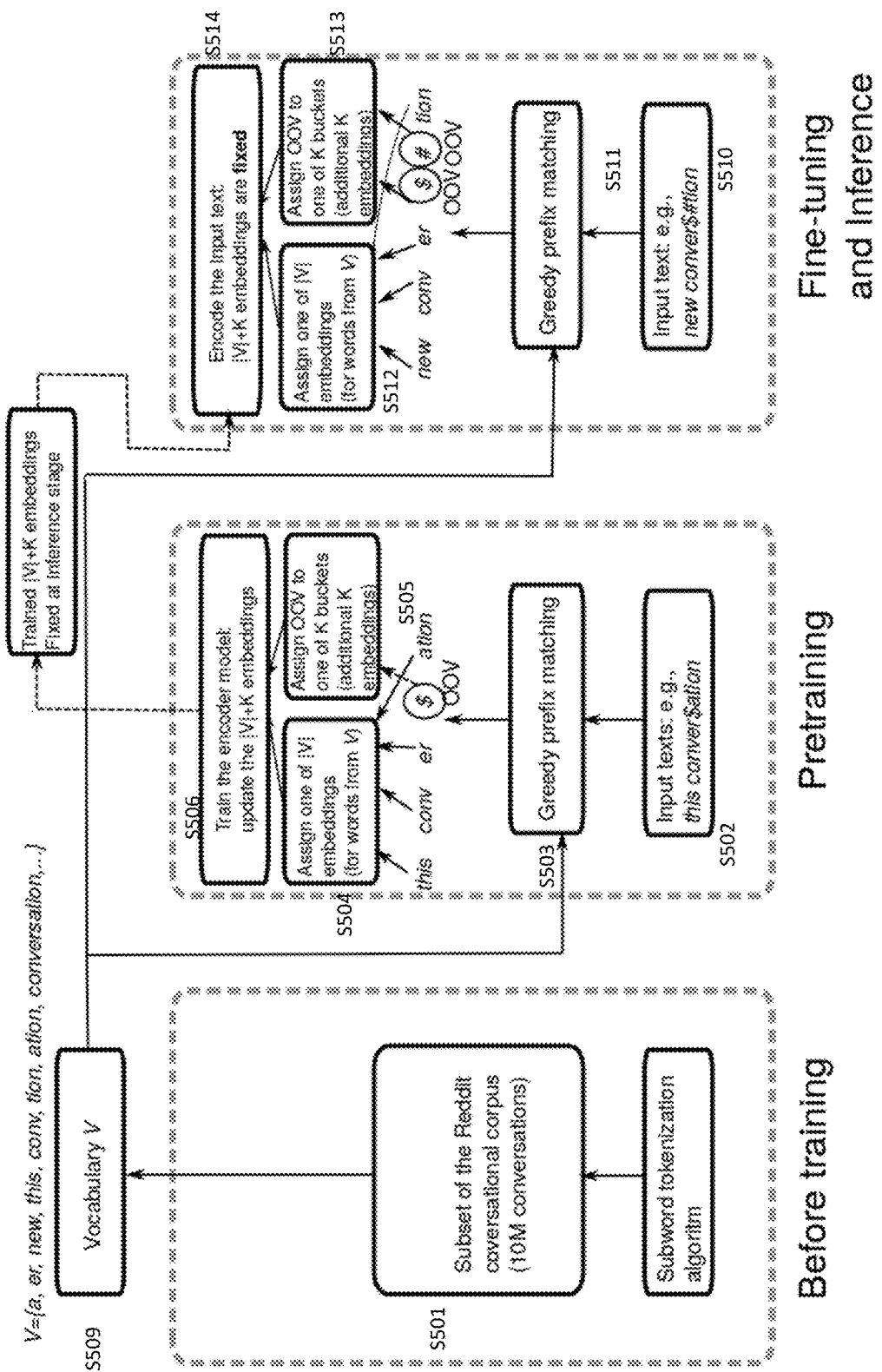
Figure 6B:
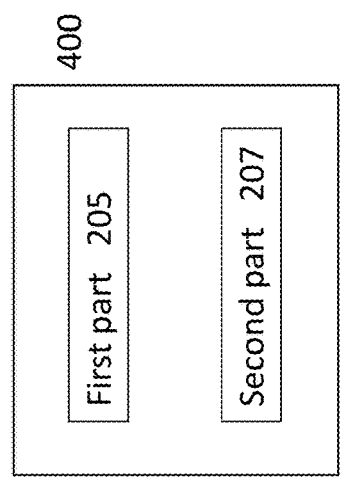
FIG. 6(*a*) is a schematic illustration of a second part of a first model used in a method according to an embodiment.

FIG. 5(b) shows a flowchart illustrating the operation of the first part 205. In particular, the part labelled "Inference" shows the operation of the first part 205 during inference and during the fine-tuning training process described in relation to FIG. 8. The "Before training" and "Pre-Training" parts of the figure will be described later. As has been described above, a vocabulary of V units is generated in the "before training" stage, each unit corresponding to a stored embedding which is learned during training. An additional K stored embeddings are also learned during the pre-training stage. OOV characters encountered during the tokenisation step are assigned one of the K embeddings, as will be described below. For each word, the tokenisation algorithm always picks the longest unit that matches the beginning of the given word, and this is repeated, always picking the longest unit from the vocabulary that matches the beginning of what is still available of the given word. If no units from the vocabulary match, the first character of the word is assigned to one of the K embeddings, and the method continues, matching the beginning of what remains of the word to a unit from the vocabulary as before. The beginning of the word is also described as a prefix.

In the example shown, an input text "new conver$#tion" is provided as input during step S510. This is divided into words, "new" and "conver$#tion". The vocabulary V in this example comprises the relevant units "a", "c", "con" "er", "this", "new", "cony", "tion", "ation", "conversation", as well as other units. In step S511, the words "new" and "conver$#tion" are tokenised using greedy prefix matching. The units in the vocabulary are compared to the characters starting from the beginning of the word, and starting from the longest units. Thus for the word "conver$#tion", the unit "ation" will be compared with the first five characters of the word first, and determined not to match, then the unit "cony" will be compared with the first four characters of the word and be determined to match. The next comparison will be taken with the remaining word, "er$#tion", and the unit "er" will be determined as the longest unit that matches. The next comparison will be taken with the remaining word "$#tion". In this case, the first character $ does not exist in any of the units in the vocabulary, thus none of the units will match. The first character is therefore "escaped", and assigned one of the K embeddings reserved for out of vocabulary characters. This process is continued until the end of the word.

By "prefix" it is meant 'preceding sequences of characters'. During the greedy matching, it is started from the beginning of the word. For each word it always picks the longest subword that matches the prefix (i.e., the beginning) of what is still available (non-segmented) of the given word.

After the subword tokenisation step S511, the units that are present in the vocabulary, e.g. "new", "cony", "er" and "ion" are each replaced with their respective embeddings in step S512. OOV characters such as "$" and "#" are assigned one of the K additional embeddings in step S513. In step S514, the embedded representation of the input text is output.

The tokenisation algorithm 501 shown in FIG. 5(b) is configured to perform the following steps:

Initial word-level tokenization: divide the entire text into a set of "words", where a "word" is a unicode string of either all alphanumeric or all non-alphanumeric characters. Two "words" are assumed to be divided by a single space (or more spaces). All spaces that are between two alphanumeric "words" are then removed.

Subword-level tokenization of "words", including escaping OOV characters: The selection of units is done in a greedy fashion from beginning to end. Each unit from the vocabulary is considered in turn. For each unit from the vocabulary that is a subunit of a word, the unit is returned, with an underscore "_" appended to its end. The list is extracted in order, choosing the longest unit in the vocabulary V that matches a prefix of the remaining portion of the encoded "word". In this step, all underscore and OOV characters which are not included in any of the units of the vocabulary are escaped. Each "unit" is formatted to begin with an underscore, or may be formatted to end with an underscore.

Final concatenation: All units are concatenated in a list. The concatenation operation is invertible because the trailing underscores signal the initial "word"-level tokenization.

FIG. 5(c) shows examples of tokenisation of input text performed by the tokenisation algorithm 501. An input string 501 such as "PolyAI develops a machine learning platform for conversational artificial intelligence." is segmented into sequence of units 503, for example: "_poly -ai _develop -s _a _machine _learning _platform _for _conversation -aI _artificial _intelligence _." In this example, each word begins with an underscore. Where a word comprises two or more units, each unit is preceded with a hyphen. Other examples of segmentation are also shown in FIG. 5(c). A list of all units from the input query is constructed. Each item from the list of concatenated units will then be assigned an embedding. A special "beginning of sequence" (BOS) token may be added at the beginning of the utterance.

Each unit in the sequence is then replaced by its embedding. Each unit from the vocabulary V is associated with a D-dimensional embedding representation, and each additional OOV "unit" is assigned one of K additional D-dimensional stored embedding representations. Each unit in the sequence is used to retrieve the corresponding embedding from the database. Thus, when a sequence has N units, then a sequence of N embeddings is output. In the example shown in FIG. 5 (a), the output 507 of the first part 207 is a N×D matrix, where each of the N rows represents one of the units in the sequence.

The sequence of embeddings is then provided as input to the second part 207. These embeddings are stored parameters of the first part 205. These parameters are learned in the pre-training phase and are then used directly during fine-tuning and inference, relying on a learned lookup table.

As has been described above, the set of |V|+K embeddings is stored, where each element of each embedding is stored using an 8 bit representation. Each element of the embeddings is stored using a computer number format that occupies 8 bits in computer memory. The 8 bits are used to define 256 equally spaced values from a min value to a max value. Each of the integer numbers from 0 to 255 may be represented by the 8 bit format. Each integer number from 0 to 255 maps to one of the float 32 format values from the min to max value. The first part outputs a sequence of embeddings, where each element of each embedding is an 8 bit representation of a number from 0 to 255. A step of converting this number to the corresponding float 32 format value (from the min value to the max value) is then performed, before inputting the higher precision version embeddings into the second part 207. The conversion may be performed in various ways. For example, a look-up table may be stored, in which each value from 0 to 255 is mapped to the corresponding value in float 32 format (from min to max). Alternatively, a function which performs re-centering and scaling of the integer number n between 0 and 255 to the corresponding float 32 format value from min to max is used. The function min+{n(max−min)/256} may be used to convert n to the embedding value for example.

Figure 6A:
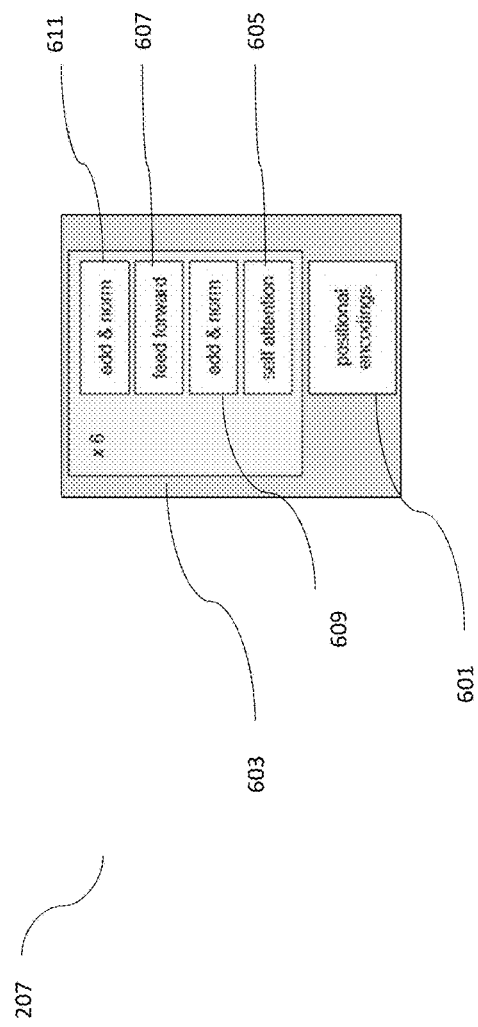

FIG. 6(a) is a schematic illustration of a second part 207. In the example illustrated in FIG. 6(a), a neural network architecture based on a "Transformer Network" is used. A transformer network is a sequence to sequence network that does not comprise any recurrent networks. The transformer network comprises an encoder part and a decoder part. An encoder part is shown in FIG. 6(a). The encoder part comprises two or more repeating modules, or blocks. Each module comprises at least one attention layer.

The second part 207 comprises a "positional encodings" step 601. The input to this step comprises the sequence of embeddings output from the first part 205, which is a list of vectors each having length D, where each element of each vector has been converted into float 32 format as described above. The parameters of the second part 207, for example the weights, may be stored in float 16 format. The operations performed may be performed in float 32 format, so that the output of each layer, and input into each subsequent layer, comprises elements which are stored as float 32 format. The elements of the context vector output from the second part 207 are float 32 format. The second part 207 is a subword-based model, in other words it takes as input representations of units (including subwords) of the input text. The second part 207 is trained to build sequential representations.

In an example, the length of the sequence of embeddings output from the first part 205 fed into the second part 207 is truncated to 60 units. Referring to the output 507 in FIG. 5(a), N=60 in this example. In case the output 507 is shorter than N=60, the sequence is padded accordingly so that all the sequences are of the same length. Padding masking is applied to mitigate any effect of the padding on further computations. Various methods of masking out the padding are known and may be used. Masking may be implemented by including indicator variables which denote which parts of the sequence have been padded and which come from the original sequence in a mask tensor. A TensorFlow sequence_mask function may be used for this purpose for example.

In step 601, the subword embeddings sequence is augmented with positional encodings. The positional encodings are in the form of vectors of length D, with one positional encoding vector corresponding to each embedding in the input sequence. The positional encoding vector is summed with the corresponding embedding in the sequence. The positional encodings step 601 thus outputs a sequence of vectors, where the sequence is the same length as the input sequence of embeddings, and each of the vectors output from the positional encodings stage 601 also has length D.

Various methods of generating the positional encoding vectors may be used, for example the positional encodings may be learned as parameters of the second part 207, or fixed (for example each element may be some function of the position of the unit in the sequence). Adding the positional encodings captures information about the position of the unit in the sequence. According to an example, the positional encoding is formed by the functions $PE_{(pos,2i)}=\sin(pos/10000^{2i/D})$ and $PE_{(pos,2i+1)}=\cos(pos/10000^{2i/D})$, where pos is the position and i is the dimension. According to another example, a vector at position pos in the sequence is added to $X_{(pos\ mod\ 11)}$ and to $Y_{(pos\ mod\ 47)}$, where mod is the modulo operator and where X is a bank of encodings with 11 vectors and Y is a bank of encodings with 47 vectors. In the latter example, up to 47×11 positions can be generalised by the network.

The sequence of vectors output from the positional encodings step 601 is then fed into a first block of a set of M repeating blocks 603. In the example shown in FIG. 6, M=6. For simplicity, a single block 603 is shown in the figure, with the repetition indicated by "×6". The output sequence of each block 603 is fed as an input to the next block 603. The output of the final block 603 is a sequence of vectors, in this case the sequence having the same length as the sequence output from the first part 205. In an embodiment, each block 603 receives a sequence of vectors each of length D, and outputs a sequence of vectors, each of length D.

Each block 603 comprises a self-attention layer 605, a layer-normalization step 609, a feedforward neural network 607 and a further layer-normalization step 611. The self-attention layer 605 uses single head attention. Self-attention layers having multi heads could also be used, however it was empirically determined that a self-attention layer having a single head was quicker to train and the performance was did not differ significantly from multi headed attention.

The self-attention layer 605 comprises three stored matrices of weights, where the weights are trainable parameters of the second part 207. The matrices may be referred to as the "query weight matrix" $W_Q$, the "key weight matrix" $W_K$ and the "value weight matrix" $W_V$. Each matrix has a number of rows equal to the embedding length D. The number of columns may be selected as a hyperparameter. In an embodiment, each matrix has dimension D×D. In another example, when D=512, each matrix has dimension 512×64. The sequence of embeddings input to the block is combined to form an input matrix, where each embedding forms a row of the input matrix. The input matrix X has a number of rows equal to the number of embeddings in the input sequence, N, and a number of columns equal to D. The matrix product of the input matrix with each of the weight matrices is taken, resulting in three output matrices, the query matrix Q, the key matrix K and the value matrix V (where $Q=XW_Q$, $K=XW_K$ and $V=XW_V$). Each of the query matrix, key matrix and the value matrix has a number of rows equal to the number of embeddings in the input sequence, and a number of columns equal to the number of columns of the weight matrices, which in an embodiment may be set to D.

The output of the self attention layer is then calculated. The output is a matrix O, which is calculated by the following matrix calculation:

$$O = \mathrm{softmax}\left\{\frac{QK^T}{c}\right\}V$$

where c is a constant. In an embodiment, c is equal to the square root of the number of columns of the key weight matrix. In an example, when each matrix $W_Q$, $W_K$ or $W_V$ has dimension 512×64, $c=\sqrt{64}$. The softmax operation normalizes the values. The output matrix O has the same number of rows as the input matrix, N, and the number of columns is equal to the number of columns of the weight matrices. For example, the output matrix also has the same number of columns as the input matrix, D. Thus O is an N×D matrix. The self-attention layer 605 allows the model to incorporate a representation of other units in the sequence into the encoding of the current unit.

In an example, the above M blocks 603 have a kernel dimensionality of 2048, a projection dimension of 64, and an embedding dimension of D=512 at the input and output.

In an alternative example, while there are M repeating blocks 603, the self attention layer 605 of each block is constrained to attend to different numbers of positions for each token. In an example with M=6, one block is constrained to attending over positions ±3 for each token, another block is constrained to attend to positions ±5 for each token, and the four remaining blocks are constrained to attending over positions ±48 for each token to help the model generalise to long sequences. This involves having growing values [3, 5, 48, 48, 48, 48] of maximum relative attention as it is progressed through the blocks. This helps the architecture to generalize to long sequences and distant dependencies, guiding training so that earlier layers are forced to group together meanings at the phrase level before later layers model larger patterns. This is implemented by using weight matrices of different dimensionality according to the layer-specific value, i.e. by selecting the number of columns.

The output matrix O is input to the layer-normalization step 609, in which it is summed with the input matrix X, and a layer-norm operation applied to the resulting matrix. Each row of the resulting matrix is then fed into the feed forward neural network sequentially.

The feed forward neural network 607 is a fully-connected feed-forward network (FFN) which is applied to each input vector separately and identically. The FFN comprises two linear transformations with a ReLU activation in between. The dimensionality of the input and output of these FFNs is D and the dimensionality of the hidden layers in each FFN is set also to D.

A further layer-normalisation step 611 is then performed to the output of the feed forward neural network 607, and the sequence of D-dimensional vectors is output of the first model 400. These comprise the sequence of embeddings output from the first model 400.

A "before training" stage of generating the vocabulary will now be described, in relation to FIG. 5(b). Prior to training, the vocabulary of units used by the tokenisation algorithm 501 of the first part 205 is first learned. FIG. 5(b) shows a flowchart illustrating the steps performed to learn the vocabulary of units, in the stage labelled "Before Training". The vocabulary is sometimes referred to as a "subword vocabulary", although, as has been explained previously, the vocabulary may also comprise complete words. This is done using a subset of the training data. An alternative training data set may be used to learn the vocabulary 509 of the first model 400, however in this example a subset of the same training data used to train the rest of the model is used.

Step S501 comprises a subword tokenisation algorithm that splits arbitrary input into subword units. The subword units into which the arbitrary input is split into is what is learned in S501. A number of subword tokenization methods are available for learning a vocabulary of units including subwords, including: supervised subword tokenization using a pretrained segmenter/tokenizer such as the Chipmunk model (for example as described in Cotterell, Ryan, et al. "Labeled morphological segmentation with semi-Markov models." Proceedings of the Nineteenth Conference on Computational Natural Language Learning. 2015), tokenization based on Byte-Pair Encodings (for example, as described in Philip Gage. 1994. A new algorithm for data compression. C Users J. 12, 2 (February 1994), 23-38; Heinzerling, Benjamin, and Michael Strube. "Bpemb: Tokenization-free pre-trained subword embeddings in 275 languages." arXiv preprint arXiv:1710.02187 (2017)), character n-grams (for example, as described in Wieting, John, et al. "Charagram: Embedding words and sentences via character n-grams." arXiv preprint arXiv:1607.02789 (2016); Bojanowski, Piotr, et al. "Enriching word vectors with subword information." Transactions of the Association for Computational Linguistics 5 (2017): 135-146), tokenization based on the Morfessor tool (for example, as described in Smit, Peter, et al. "Morfessor 2.0: Toolkit for statistical morphological segmentation." Proceedings of the Demonstrations at the 14th Conference of the European Chapter of the Association for Computational Linguistics. 2014), and WordPiece (for example, as described in Schuster, Mike, and Kaisuke Nakajima. "Japanese and korean voice search." 2012 IEEE International Conference on Acoustics, Speech and Signal Processing (ICASSP). IEEE, 2012) or a neural variant of this model such as is used in several natural language processing representation architectures such as BERT (for example, as described in Devlin, Jacob, et al. "Bert: Pre-training of deep bidirectional transformers for language understanding." arXiv preprint arXiv: 1810.04805 (2018)).

A sub-word vocabulary can be learned from the training data set using the following steps, based on a byte-pair encoding method for example:

Initial word-level tokenization is performed for the subset of training data. In this step, the text is divided into a set of "words", each comprising a string of characters.

The subword vocabulary size is set, for example V=32,000. This is a hyper-parameter which may be varied to improve performance.

Each word is represented as a sequence of characters. The word frequency is appended to each word, i.e. how many times the word appears in the subset of the training data.

A subword is generated by merging pairs of characters, and selecting the subword as being the pair having the highest frequency occurrence in the subset of training data. This subword then replaces the pair of characters throughout the training data set, and is treated as a new "character" in the subsequent steps.

The previous step is repeated (with the previously generated subwords being treated as "characters") until the selected subword vocabulary size is reached.

Alternatively, a subword vocabulary may be learned from the data using the SentencePiece model. SentencePiece is a subword tokenizer tool. A description of SentencePiece is given in Kudo, Taku, and John Richardson. "Sentencepiece: A simple and language independent subword tokenizer and detokenizer for neural text processing." arXiv preprint arXiv:1808.06226 (2018), the contents of which are incorporated herein by reference. The SentencePiece tool is available at <https://github.com/google/sentencepiece>. In a further embodiment, a variant of the SentencePiece tool which is based on the unigram language model (ULM) is used, as described in Kudo "Subword regularization: Improving neural network translation models with multiple subword candidates." arXiv preprint arXiv:1804.10959 (2018), the contents of which are incorporated by reference herein.

In an example, learning a sub-word vocabulary from the training data set using the SentencePiece tokenizer tool comprises the following steps:

The text is divided into a set of "words", each comprising a string of characters.

The subword vocabulary size is set, for example 32,000. This is a hyper-parameter which may be varied to improve performance.

The probability of word occurrence is optimised by giving a word sequence

The loss of each sub-word is computed.

The sub-words are sorted according to their respective loss, and the top X % of the sub-words with low loss are kept (e.g. X=80%).

The last three steps are repeated until a subword vocabulary size equal to the defined amount (e.g. 32,000) is reached.

During the pre-training stage described in relation to FIG. 7 above, the parameters of the first model 400 are learned. Once the vocabulary 509 of the first model 400 has been learned in S501, the first part 205 can be used to segment an input text into a list of subwords during the pre-training stage, using the tokenisation algorithm in the same manner as has been explained in relation to FIG. 5(a). The difference in the "Pre-Training" stage is that the embeddings assigned to each unit are optimised in the subsequent steps. The segmentation algorithm described above in relation to the Before Training stage is not used in the pre-training or inference stages for segmentation of input text into units. Rather, a 'hybrid' approach is used, where the segmentation algorithm is used to learn the vocabulary, and a greedy tokensiation algorithm, which is quicker and does not require storing parameters of another model on the device is used to segment the input text, by matching parts of the input text to the stored units. A segmentation model is used as a pre-training step of obtaining the vocabulary V. By not relying on a specific model for segmenting the input text, that is, by relying on much simpler greedy matching, a different vocabulary may be used without having to re-train the tokenisation algorithm. The simple matching tokenisation algorithm works with any vocabulary V and does not require a standalone segmentation method if the vocabulary V is known.

During the "Pre-Training" stage, and as described above, the first model 400 is trained. This means that the values of the embeddings used by the first part 205 and the parameters of the second part 207 are updated. During the "pre-training" stage, an input text is provided in S502. The input text is tokenised in S503 using the greedy matching approach as described in relation to FIG. 5(a) and the "Inference" stage of FIG. 5(b) above. In step S504, units that are present in the vocabulary 509 are assigned their respective embeddings, so in this example, units such as "this", "cony", "er", "ation" are assigned their respective embeddings. OOV characters such as "$" is assigned to one of K additional embeddings in step S505. Each unit in the vocabulary V is stored with a corresponding embedding, which is a vector of length D. K additional embeddings are also stored. The embeddings are randomly initialised.

In step S506, a sequence of N embeddings, in the form of N×D matrix 507 (described above in relation to FIG. 5(a)) is outputted and fed into the second part 207. During pre-training, the embeddings are updated and learned as parameters of the first model 400. The embeddings are thus considered trainable parameters of the first part 205. The embeddings are learned starting from random initialisations. During pre-training, each unit from the vocabulary V gets assigned a dedicated embedding, and an additional K embeddings are included. These are then optimised during the pre-training.

In an example, the second part 207 is configured to receive a sequence of N=60 units. In selecting data from the training set, sentences with >128 characters are excluded. Therefore, in most cases, the sequence has a length of less than 60 units. When the output 507 is shorter than N=60, the sequence is padded accordingly so that all the sequences are of the same length. Padding comprises, for example, zero padding. In addition, padding masking is applied to mitigate any influence of the zero padded values on subsequent computations. In case the length is greater than 60 units, then the sequence is truncated. Truncation is carried out such that no subwords are split. The training data is thus limited to sentences with a maximum of 128 characters. This increases training speed, as modelling longer sequences does not contribute much to the overall model quality, while it slows down training.

As described in relation to FIG. 7 above, during the pre-training stage, pairs of sentences are taken as input. Each of the input sentence and the template sentence are converted to a sequence of embeddings by the first model 400. An input sequence of embeddings is generated by the first model 400 from the input sentence, and a template sequence of embeddings is separately generated by the first model 400 for the template sentence. The weights in the first model 400 are shared for both the input sentence and the template sentence. In other words, during pre-training, the parameters of the first model 400 are shared between the input and template side. Only a single set of parameters is stored and updated, and these are used for the operations on the input and template side. In particular, the stored subword embeddings of the first part 205 are shared between the input and template side. These parameters may be shared because they are used to learn encodings of text in isolation by relying on the properties of the text that gets encoded. By sharing the parameters, the model size during training is reduced, so that fitting larger batches may be fed into GPU memory, thus speeding up the training process.

After the pre-training stage, the embeddings corresponding to each of the V subwords of the vocabulary are stored in a database with the corresponding subwords, together with the additional K embeddings, and the embeddings are simply retrieved during use.

As has been described above, in use, each element of the subword embeddings 507 is stored using a computer number format that occupies 8 bits in computer memory. The 8 bits are used to define 256 equally spaced buckets between a min value and a max value. The min and max values may be pre-specified as hyper-parameters. Optionally, the min and max values are updated throughout the training of the second part 207 with the goal that all the subwords embedding elements encountered are included within the min and max range. Hereinafter, representation using the above format will be referred to as 8-bit representation.

During the forward pass, although the embeddings are stored using the 8-bit representation to reduce the amount of memory occupied, they are converted to a floating point format, float 32, before being taken as input to the second part 207. The conversion from the 8-bit representation above to float 32 format may be performed by scaling and re-centering as has been described above. In an example, the 8-bit representation uses the int8 signed integer format however, any format that occupies 8 bit in memory could be used.

During training of the first part 205 and second part 207, the min and max values are updated at every M batches. For example, M=500 or 1000. Updating comprises looking up the minimum and maximum values of the float 32 copies (described further below) of the embedding element values, and setting the new min and max values accordingly. For example, the min and max values may be set so that the width of the range (i.e. max-min) is within either 0.01 or 10% of the width of the range of the embedding element copies stored in the float 32 format. After training is complete, the float 32 copies of the embedding elements are discarded and the 8-bit representation of the learned embeddings, along with the updated value of (min, max) in float 32 format are stored.

The unit embeddings make up a large part of the stored model parameters, thus storing these with a reduced precision results in a significant reduction of model size. In an example, by storing these embeddings using 8 bit precision instead of in IEEE 754 single precision format (also referred to as FP32 or float32), the model size may be reduced almost 4 times.

Various other parameters of the second part 207 may also be stored using a computer number format that occupies 8 bits or 16 bits in computer memory. Optionally, an IEEE 754 16-bit (also referred to as FP16 or float16) half-precision format or an 8-bit representation of other network parameters may also be used. This allows the reduction of the model size slightly more, but the impact is less than for the embeddings.

The reduced precision is accounted for by various modifications used during training, which allows use of quantized parameters during inference, i.e. a lower-resolution copy of the parameters. Thus, a fully compressed model can be used during inference. Applying quantization to the dual-encoder during training allows reduction of the size of the model whilst maintaining accuracy. Rather than 32-bits per parameter, embedding parameters are represented using only 8-bits, and optionally other network parameters may be represented with 8 bits or 16 bits. The training is performed in a "quantization-aware" manner, by applying the following modifications to the training process.

Firstly, the training graph stores the parameters using float32 precision, computing gradient updates in that space. Thus the parameters of the first model 400, including the weights and embeddings, are stored in float 32, or single precision format.

The forward pass is performed using reduced precision copies of the weights, as has been described previously. As described previously, a step of converting the embedding elements from 8-bit representation to float 32 format is performed before the sequence of embeddings is inputted to the second part 207.

The activations (inputs to each layer in the second part 207) are stored using 16 bit (float16) representations, for use during back-propagation. The gradient of the loss with respect to each of the trainable parameters is then determined through back-propagation, using the stored activations, which were cached during the forward pass. The gradient of the loss with respect to each of the trainable parameters is stored using float16 format. The training may be performed in batches, resulting in an array of gradient values, each corresponding to a parameter, for each training example in the batch. These are converted to a single gradient value for each parameter (for example by taking the average of the gradient values for all training examples for the particular parameter). The gradient for parameter $\nabla J(x)$ is then used to calculate the updated parameter from the previous value using the optimizer function:

$$x = x - \eta \nabla J(x)$$

where $\eta$ is the learning rate and x denotes a network parameter or embedding. The optimizer function takes the original parameter x, stored using 32 bit representations, and the gradient for the parameter $\nabla J(X)$, stored using float16 format. In the optimizer function, the gradient is multiplied by the learning rate $\eta$. The learning rate is a hyperparameter that has a small positive value. The result of this multiplication is stored using FP 32 and used to calculate the updated parameters, which are also stored using FP 32.

The updated parameters are then converted to the lower precision formats for use in the next training iteration. A function $f_1(x)$ is used to convert the stored float32 parameter x into a step-quantized float16 representation, and a function $f_2(x)$ is used to convert the stored float32 parameter x to the 8 bit representation in the case of the embedding elements. In an example, min=−0.1, and max=0.1. The inference graph saves the lower-resolution copy of x, that is, it uses f(x) instead of x. Standard methods of converting from FP32 to FP16 may be used, for example the astype function of the Python numpy library can be used (<https://docs.scipy.org/doc/numpy/reference/generated/numpy.ndarray.astype.html>). For conversion from FP32 to 8-bit representation, the FP32 number is mapped to one of the $2^8$ values from min to max, and then this value is mapped to an integer number from 0 to 255 in the manner described previously.

Quantization of the embeddings and optionally other parameters is thus simulated during training, and the computations in the second part 207 may be computed using FP16. Some operations such as softmax or reduce sum are carried out in float32, where they are numerically more stable, and then converted to float16. The inference graph uses the quantized parameters (that is, float16 for the parameters of the second part 207, and 8 bit representation for the embeddings of the first part 205). In the backward pass, $f_1'(x)=1:0$ is forced and the weights are shadowed with FP 32 versions so that the updates are fine-grained. Forcing $f_1'(x)=1.0$ means that the gradients computed in float16 are cast back to float32 and applied to the float32 parameter directly. $f_1'(x)$ is technically zero everywhere with discontinuities where $f_1(x)$ jumps.

By storing the result of the multiplication of the gradient by the learning rate using FP 32, a case where this result is too small to be represented in FP 16 or 8-bit representation is avoided. Furthermore, by computing the subsequent addition using FP 32, the case where the second term in the optimizer function is much smaller than the first term, and thus becomes zero when the addition operation is performed using FP 16 or 8 bit for the second term is avoided. Thus, while in principle all parameters could be represented by FP16, some operations, such as multiplying the gradient by the learning rate, are carried out in FP32 space to improve numerical stability and performance of the model.

During use, only the reduced precision copies of the parameters are stored, and the FP 32 versions are discarded. Thus the first model 400 size during use is reduced. During training, although the weights are also stored in FP 32, the activations are stored in reduced precision, thus reducing the overall memory required to perform the training. By representing the trainable parameters of the second part 207 in FP16, the fact that CPUs (such as the Tesla K80) support operations in FP16 can be exploited. Use of FP16 has the effect of almost doubling the number of batches that can be fit into the GPU memory (compared to using FP32).

During training a float32 precision copy of each variable is used to accumulate gradients, but before it is used in the forward pass it is cast to float16, or 8 bit representation in the case of the embedding elements. Gradients then have float16 precision, but are multiplied by the learning rate in float32 space and used to update the training copy. For inference the first model 400 parameters (e.g. the embeddings) are stored using the relevant 8 bit/float 16 representation and may then be converted to float 32 when doing the various operations for each input.

Secondly, the loss value computed in the forward pass may be scaled, prior to the back-propagation being performed. The gradient of the loss with respect of each of the parameters $\nabla J(x)$ is used to calculate the updated parameter using the optimiser function. The gradient values tend to be small values, and may be too small to be represented using FP 16 or 8 bits. Scaling the loss value results in the gradient values calculated during back propagation being scaled by the same amount. Thus by scaling the loss values, the gradient values can be scaled such that they are representable in FP 16 or 8 bits. In an embodiment, the loss is scaled using a constant scaling factor. For example, the loss is scaled by a factor S and updates are then scaled by 1/S. In an example, S=128.0. The scaling factor allows the gradient computations to stay well represented by FP16 i.e., they will not get rounded to zero.

Thirdly, various operations in the forward pass and in the back propagation may be performed using different precision. In particular, operations involving sums of vectors or matrices may be carried out using FP 32. This includes, for example, the addition of the positional encoding vectors and the layer-normalisation step operations in the forward pass. Such operations may take reduced precision inputs and store reduced precision outputs, but the arithmetic is performed using FP 32. Point-wise operations, such as those performed in the self-attention layers, may be performed using FP 32, or FP 16. Vector dot product operations may be performed by storing each element product into FP 32 representation, before performing the addition step. A step of converting to a reduced precision for final storage is then performed.

In an example, operations in the network are done with float16 precision, except a few such as softmax or reduce sum that are unstable in float16. These are done in float32 and then cast back to float16. Some operations in the graph are empirically determined to be performed using FP32 precision to be numerically stable including the layer normalization, L2-normalization, and softmax in attention layers.

The float16 computations in the training graph are accelerated by the CPUs tensor cores. The reduced data size allows fitting larger batches into GPU memory, thus speeding up the training process. As a result, the efficiency of training improves in terms of examples per second. The final model is not only smaller, but also reaches a higher accuracy after e.g. an 18 hour limit.

In summary, the mixed precision training may comprise one or more of the following steps:
1. Maintain a master copy of trainable parameters (weights of second part 207, and embeddings of first part 205) in FP32
2. For each training iteration:
    a. Make an FP16 copy of the weights, and an 8 bit representation copy of the embeddings
    b. Forward propagation
    c. Multiply the loss with the scaling factor S
    d. Backward propagation (FP16 weights, activations, and their gradients)
    e. Multiply the weight gradient with 1/S
    f. Complete the weight update and update the master copy of trainable parameters (in FP32 space), and then generate the reduced precision versions from the master copies.

Once training is completed, the learned parameters of the second part 207 are saved in the inference graph in FP16 format and the embeddings of the first part 205 are saved in the first part 205 using the 8-bit representation described above.

It is desirable to reduce the size of the first model 400, comprising the first part 205 and the second part 207, so that less memory is required to store the model. In particular, unit embeddings, and weights and other parameters of the first model 400 are stored in working memory when the model is executed. It may be desirable to use the model 109 on a device with limited storage space such as a cell phone or tablet. Similarly, during training time, it is desirable to reduce the size of the model 109, so that training may be performed more quickly. For example, through quantization, the batch size can be increased.

The first and second part are compressed using subword-level parameterisation and quantisation. Quantization of the stored embeddings, as well as optionally that of other neural network parameters, reduces model storage requirements. This also enables quicker and more efficient model training. The combination of these two compression techniques reduces the size of the first model 400.

As described in relation to FIG. 2 above, a dialogue management step is performed in S204 based on the determined slot value. In this step, a system act is determined. Various example dialogue management methods which may be used in the method of FIG. 2 will now be described. The dialogue manager chooses an appropriate system response following the latest user utterance. To do this, the dialogue manager takes the dialogue system's internal estimate of the dialogue state (the belief state) updated in S203 as input to produce the system act, which is the dialogue act representation of the dialogue system's response to the user utterance. The updated belief state information generated in S203 is therefore taken as input in S204. Other information extracted from the input user utterance may additionally be taken as input, for example the estimated user act type and/or mentioned requestable slots.

The input to the policy component is the flat NLU output, i.e. the updated belief state and any additional information extracted from the input user utterance. The NLU output, i.e. the updated belief state, for a dialogue turn may comprise a list of one or more slot-value pairs, or a probability score for one or more slot-value pairs. A rule based policy model may be used in S204, in which the desired system behaviour is manually specified. The policy model selects a system act from a plurality of stored possible system acts, based on a set of rules. The rules may be applied to the information in the belief state, and any other information—for example a set of stored parameters specifying the system behaviour, information in a database and/or information obtained from a third party system for example. The set of system acts may comprise discourse, confirm, statement and/or request acts for example. The set of system acts may comprise one or more of the following acts:
  system_discourse:
    greeting( )
    goodbye( )
  system_confirm: based on the user statement, confirm what user just said.
    confirm(slot=value)
    confirm(slot)

system_statement: offer user the current status of the database.
   offer(name=X, slot=val, . . . )
   compare(name1=X, name2=Y, slot=val, . . . )
   count(count=?, slot=val)
system_request: ask user a question, could be proactive.
   request(slot)
   request(slot=val)
   request_all(slot=val)
   request_all(name=X)

The policy model may comprise a hand-crafted finite state machine (FSM) which encodes a set of rules for constructing system turns, with each turn comprising a response frame which responds to the user's previous turn and an initiate frame which drives the dialogue forward through a predetermined sequence of sub-dialogues. For instance, these sub-dialogues can be: gather user preferences, query a database via an API, offer matching entities to the user, allow user to modify preferences or request more information about an entity, and finally complete the transaction (booking the entity). An example of an FSM-based policy model (for task-independent database querying applications such as restaurant search and booking) is provided in FIG. 10. It is possible to pre-specify all the desired transitions, and therefore system behaviour as a response to user acts can be customised. Such engineered finite state machines implicitly define a model of expected user behaviour in the states and transitions of the system agent. Alternatively, a learned dialogue policy may be used to map the current dialogue state hypothesis (belief state and user dialogue act) to one of the possible system actions. For example, the dialogue management policy model may use Markov Decision Processes (MDPs) to allow the dialogue policy to be learned from data using reinforcement learning. A Partially Observable Markov Decision Process may alternatively be used, in which the (true) dialogue state is treated as a hidden variable.

Figure 11:
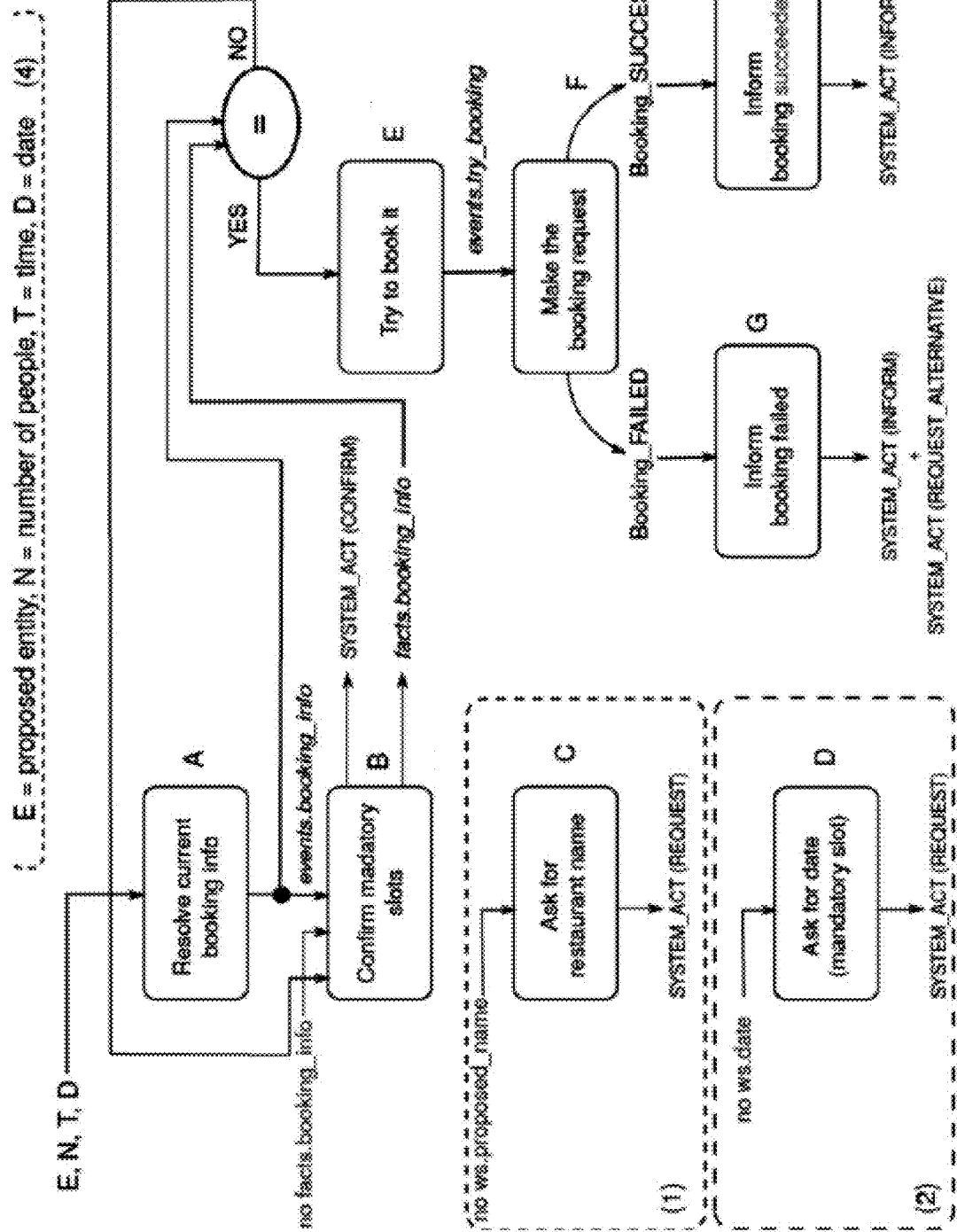
FIG. 11 shows a policy model used in a dialogue method according to an embodiment.
Figure 12:
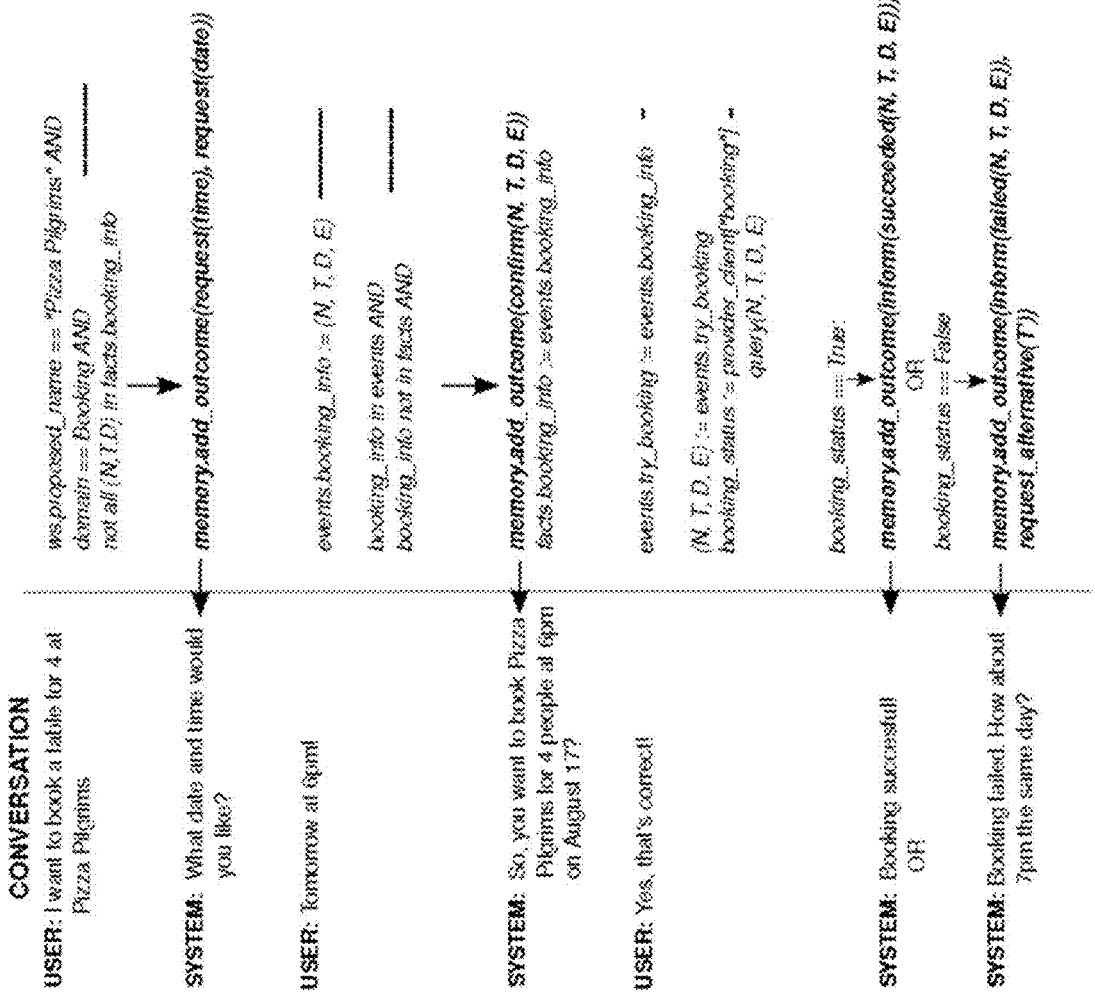
FIG. 12 illustrates an example dialogue which may be generated using a dialogue method according to an embodiment.

An example using a rule based approach, in which a series of rules comprising a condition relating to the belief state information are applied in S204 will be described. If a condition is fulfilled, the rule triggers, and the step specified in the rule is performed. The step may comprise a particular dialogue act being selected or a third party call being made for example. For example, an "act selection" rule may comprise a condition that: if a mandatory slot has not been specified, a request act for the slot value is triggered. In a restaurant booking example, one or more of the following rules of this type may be included: If "Restaurant name" not specified, request "Restaurant name"; If "Date" not specified, request "Date"; If "Time" not specified, request "Time"; and/or If "Number of people" not specified, request "Number of people". FIG. 11 shows a rule-based policy model for booking a restaurant, according to an example. In FIG. 11, stages C and D show the case where the restaurant name and date are not specified respectively. As can be seen, a request act is selected in each case. FIG. 12 shows the case where the first dialogue turn corresponds to stage D, i.e. the condition "If "Date" not specified" is fulfilled. Thus the first group of rules relate to blocks 1 and 2 in FIG. 11. If the proposed entity is not set (i.e. still do not know which restaurant is the intent of the user), the rule "Ask for restaurant name" will fire and one outcome will be the system act requesting the actual restaurant name (Block 1). Further act selection rules relating to confirmation of received information may be included.

Further rules relating to a third party call may be included. Such rules may comprise a condition that if the mandatory information is provided, a booking action is taken for example. The booking action may comprise the system issuing a third party call. For example, it may comprise communicating with the selected restaurant's system to determine whether it is possible to make the reservation for the current (N, T, D) combination. The booking action may have multiple outcomes. For example, in this case, there are two possibilities: the booking request succeeds or the booking request fails. Further act selection rules may inform of the outcome of the booking action. Thus if the booking request succeeds, the system fires the "Inform booking succeeded" rule which will inform the user about the success and if the booking request fails, the system then fires the "Inform booking failed" rule, which informs the user about the failure. Where the system has received alternatives from the third party system as part of the booking action, there may be two acts (one to inform that the booking failed and one to inform of one or more alternatives provided by the third party system).

Further general rules may be included, for example, a rule setting a bye act when the conversation is determined to be completed may also be included. For example, a rule conditioned on the user_action.act_type=FINISHED and "user_action.probability">0.7 for example. A further rule setting a "bye and confirm" act when the conversation is determined to be completed with a lower probability may also be included, for example when the conversation is complete with 0.5<user_action.probability<=0.7. In this case, an act 'any else I can help with?' may be issued. The user_action.act_type may be determined by the dialogue act classifier, which identifies the user input act type as has been described above. Additionally or alternatively, a rule selecting a default outcome (default dialogue act, e.g. a "can't help" act), conditioned on no outcomes having been selected (i.e. the set of outcomes stored in the working memory being empty) may be included.

As described in relation to the above booking scenario example, at each dialogue turn, a dialogue act is selected based on one or more rules. The rules may comprise a condition evaluated based on the information in the belief state and/or the world state. If a condition is fulfilled, this may select the dialogue act. Alternatively, this may trigger another type of action (for example a booking action, a resolution step, or a world state update), which in turn leads to a selection of a dialogue act through application of a subsequent rule. Where two or more conditions are fulfilled for different rules, two or more dialogue acts may be selected. Alternatively, the dialogue or acts having the highest importance is/are selected. The above described method may be implemented using three main components: 1) Working memory; 2) Engine; 3) Rules. The engine is a component that hosts and triggers the rules based on the belief state and other dialogue information stored in the working memory. The engine comprises stored code which accesses and reads the rules and, based on the outcome of each triggered rule, modifies the dialogue information in the working memory. The rule firing method fires the ones that match the conditions. For example, the engine may be implemented using the RETE algorithm which determines when each rule is applied (i.e. when the condition in each rule is evaluated).

As described in relation to the example above, rules are applied in S204 which determine the system response to the input user utterance. Other approaches, such as data driven approaches, may be used however. A text signal corresponding to the selected dialogue act or acts is then generated in S205, as has been described above.

An example value extractor model 109 was trained using a pre-training dataset based on 3.7 billion comments in a Reddit based corpus from 2015-2018 (inclusive). Filtering this to comments between 9 and 127 characters in length yielded a total of almost 2 billion filtered comments as the initial dataset. This resulted in 1.2 billion example sentence pairs in the training set, and 61M pairs in the test set. The mean number of words per keyphrase was 1.3. The value extractor model reached a precision of 84.8% and a recall of 85.3% on the test set, using 25% random negatives. The variant without the auxiliary loss (termed no-aux in the below) reached a precision of 82.7% and a recall of 83.9%. Unless noted otherwise, in all following results the use of the variant with the auxiliary loss is made. These results suggest the value extractor model has an ability to generalize over unseen natural language data.

Several diverse slot-labeling data sets were used to further evaluate the model, including a recent data set RESTAURANTS-8K from Sam Coope et al, 2020: "Span-ConveRT: Few-shot span extraction for dialog with pretrained conversational representations", Proceedings of ACL, pages 107-121, the entire contents of which are incorporated by reference herein. This dataset comprises conversations from a commercial restaurant booking system. It covers 5 slots used for the booking task: date, time, people, first name, and last name. In order to investigate the model behavior in low-data regimes, few-shot scenarios were simulated, performance measured on smaller sets sampled from the full data, by (randomly) subsampling the training sets of various sizes whilst maintaining the same test set. The average F1 scores for extracting the correct span per user utterance are shown below in Table 2, where VE refers to the value extractor model (also referred to as the ConVEx model). If the models extract part of the span or a longer span, this is treated as an incorrect span prediction:

TABLE 2

Average F1 scores across all slots for the evaluation on RESTAURANTS-8K test data with varying training set fractions. Numbers in brackets denote the training set sizes.

| Fraction | VE-no-aux | VE-full |
|---|---|---|
| 1 (8198) | 95.6 | 96.0 |
| ½ (4099) | 94.1 | 94.1 |
| ¼ (2049) | 92.2 | 92.6 |
| ⅛ (1024) | 90.0 | 90.6 |
| 1/16 (512) | 86.2 | 86.4 |
| 1/32 (256) | 78.4 | 81.8 |
| 1/64 (128) | 73.4 | 76.0 |
| 1/128 (64) | 70.9 | 71.7 |

In full-data scenarios, the model yields strong performance reaching >95% average F1. The data also shows the ability of the value extractor model 109 to handle few shot scenarios, as the number of annotated examples for the labeling task is reduced. Pretrained representations are useful for slot-labeling dialog tasks, and the importance of pretraining becomes increasingly important for few-shot scenarios. The chosen pretraining paradigm impacts the final performance. The approach to pretraining, which is tailored for slot-labeling tasks in particular, is robust and adapted to few-shot slot-labeling tasks. It is possible to learn effective domain-specific slot-labeling systems by simply fine-tuning a pretrained general purpose slot labeller, relying only on a handful of domain-specific examples. The two variants (with and without the auxiliary loss) are also compared in Table 2. In general, the variant with the auxiliary loss has a slight edge over the alternative without the loss.

Evaluation of the model demonstrated state-of-the-art performance across a range of diverse domains and data sets for dialogue slot-labelling, with the largest gains reported in the most challenging, few shot setups. The value extractor model was evaluated on a range of diverse dialogue slot labelling data sets spanning different domains. It yielded state-of-the-art performance across various evaluation data sets, but its true usefulness and robustness came to the fore in the few-shot scenarios. The value extractor model is shown to be effective to slot labelling across a spectrum of diverse slot-labeling domains and data sets, reporting state-of-the-performance in full-data setups, as well as good performance in the most challenging, few-shot setups.

Optionally, the value extractor decoder layers (the third model 409) may be further pre-trained on labelled data from other slots and domains. By appending the slot name to the template sentence input, this allows training on all the slots. This gives a single updated fine-tuned decoder model 409, trained on other slots of other domains. This is approach is evaluated by, for each slot in the target domain, fine-tuning 3 decoders. The resulting predictions are ensembled by averaging probabilities to give final predictions. This helps reduce variability and improves prediction quality. The results across different training data sizes are summarized in Table 3:

TABLE 3

Comparison of average F1 scores across all slots for RESTAURANTS-8K for the value extractor (VE) with and without ensembling. The VE ensemble model fine-tunes 3 decoders per slot, and then averages their output scores.

| Fraction | VE | VE ensemble |
|---|---|---|
| 1 (8198) | 96.0 | 95.8 |
| 1 = 2 (4099) | 94.1 | 94.2 |
| 1 = 4 (2049) | 92.6 | 92.5 |
| 1 = 8 (1024) | 90.6 | 90.7 |
| 1 = 16 (512) | 86.4 | 88.2 |
| 1 = 32 (256) | 81.8 | 83.9 |
| 1 = 64 (128) | 76.0 | 78.2 |
| 1 = 128 (64) | 71.7 | 73.5 |

While there is no performance difference when a sufficient number of annotated examples is available, the scores suggest that the model ensembling strategy does yield small but consistent improvements in few-shot scenarios, as it mitigates the increased variance which is typically met in these setups.

Figure 13:
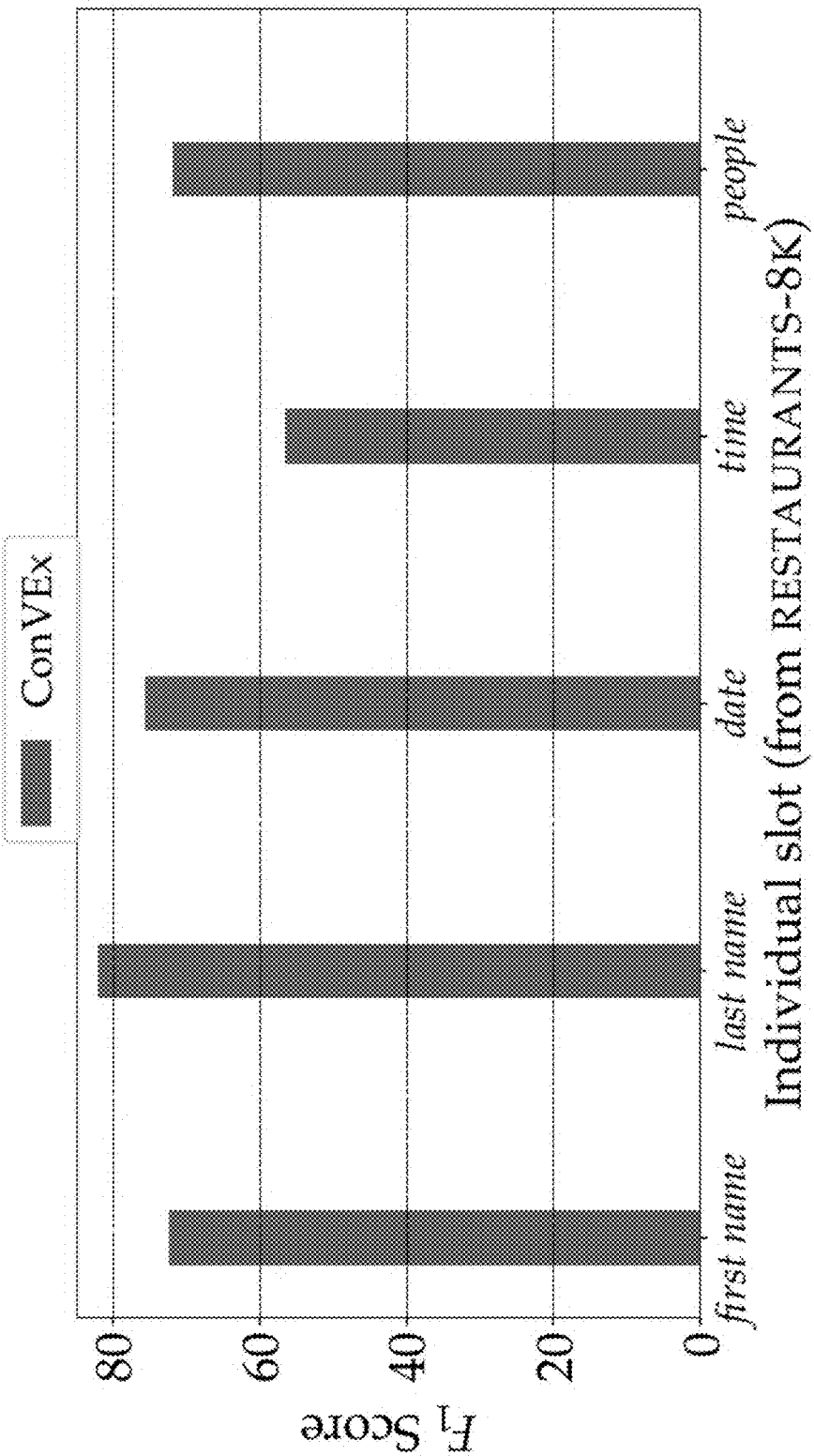
FIG. 13 shows average F1 scores for each slot for an example value extractor model.

The pretraining task, and the fact that the value extractor model sequence-decoding layers (the third model 409) are pretrained, rather than learned from scratch, provides improved performance. The inductive biases of the pretrained value extractor model, that is, how the pretraining regime and the main assumptions affect its behaviour and performance before and after fine-tuning were also analysed. Per-slot performance on RESTAURANTS-8K for the value extractor with the auxiliary loss was analysed. The scores in a few-shot scenario with 64 examples are provided in FIG. 13. The results indicate good performance for the slots first name and last name. By the value extractor design, the keyphrases extracted comprise rare words, and are thus likely to cover plenty of names without sufficient coverage in small domain-specific data sets. Good performance is also achieved for the other three slots which cover narrower semantic fields and where less lexical variability is expected (people, date and time). FIG. 13 shows average F1 scores for each slot for the model trained on 1/128 of the RESTAURANTS-8K training set, i.e., 64 examples.

Figure 14:
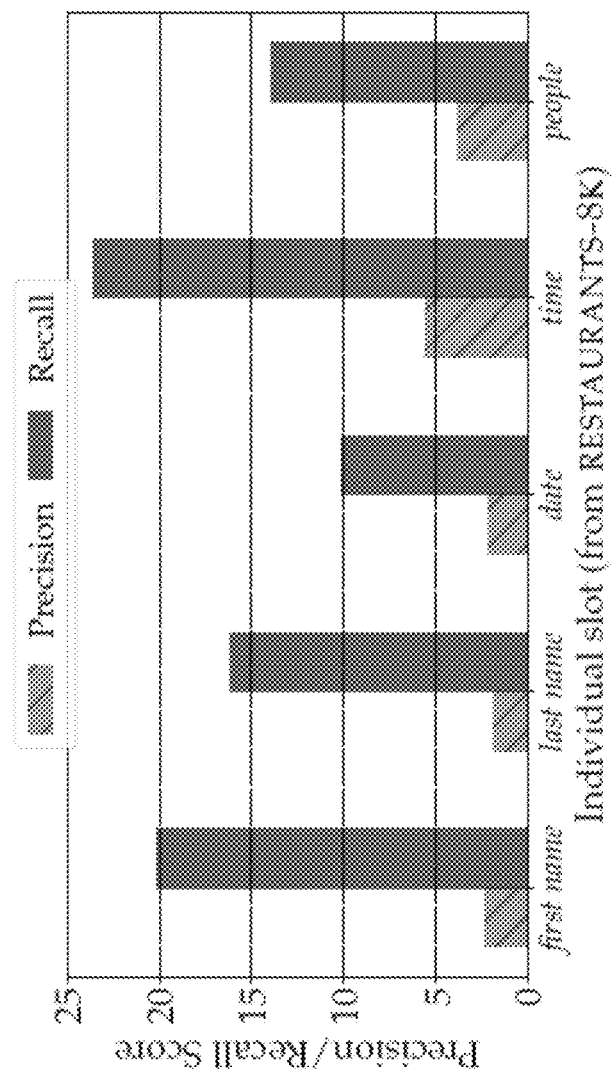
FIG. 14 shows precision and recall of an example value extractor model.

FIG. 14 shows the results of running a value extractor model with no slot-specific fine-tuning on the RESTAURANTS-8K test set, feeding the user input as both the template and input sentence. At most one value is extracted from each sentence, where the model predicted a value for 96% of all the test examples, 16% of which corresponded to an actual labeled slot, and 86% did not. The highest recalls were for the name slots, and the time slot, which correlates with the slot-level breakdown results from FIG. 13. The most frequent predictions from the non-finetuned decoder that do not correspond to a labeled slot on RESTAURANTS-8K give further insight into its inductive biases. The top 10 extracted non-labeled values are in descending order: booking, book, reservation, a reservation, a table, indoors, restaurant, cuisine, outside table, and outdoors. Some of these may make sense to be modeled as slot values with an extended ontology, such as indoors or outdoors/outside table. FIG. 14 shows the precision/recall of the decoder across all slots in RESTAURANTS-8K without any fine-tuning.

The value extractor uses a light-weight pretraining and finetuning neural approach to slot-labeling dialog tasks. It allows learning of domain-specific slot labelers even in low-data regimes by fine-tuning sequence-related layers of the pretrained general-purpose value extractor model. This is enabled by the pretraining objective, based on a sentence-pair value extraction task from general natural language data, which is structurally aligned with its intended usage on slot labeling tasks. Although described here in relation to slot-labelling, the value extractor model could also be applied to related tasks such as named entity recognition and conversational question answering for example.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made.

The invention claimed is:

1. A computer implemented method comprising:
receiving input data relating to a speech or text signal originating from a user;
representing the input data as a first sequence of first representations, each representation of the first representations representing a respective unit of units of the input data;
representing the input data as a second sequence of second representations, each representation of the second representations representing a respective unit of the units of the input data,
wherein the first sequence includes a representation of a given key phrase of the input data and the second sequence includes a representation corresponding to the given key phrase of the input data;
determining, using a model, a tag sequence for the first sequence of first representations, wherein the model employs a combining layer that combines the first sequence of first representations and the second sequence of second representations to determine the tag sequence, wherein the tag sequence comprises one or more tags from a set of tags comprising a first tag;
determining that one or more units of the input data correspond to the first tag;

determining, in response to determining that one or more units of the input data correspond to the first tag, a system dialogue act based on a given part of the input data corresponding to the first tag; and
outputting speech or text information specified by the system dialogue act determined.

2. The method according to claim 1, wherein the first tag is a slot value tag, and wherein the set of tags comprises a before tag, tagging a part before the slot value, and an after tag, tagging a part after the slot value.

3. The method according to claim 1, wherein the combining layer is an attention layer.

4. The method according to claim 1, wherein the model is a linear chain conditional random field model.

5. The method according to claim 1, wherein the model is configured to generate a set of parameters for each unit representing a likelihood of each tag in the set for the unit, and a likelihood of each tag in the set for the unit together with each tag in the set for a following unit.

6. The method according to claim 5, wherein determining the tag sequence comprises determining the tag sequence with the highest probability from the sets of parameters.

7. The method according to claim 1, wherein the model is a second model and wherein the first sequence of first representations and second sequence of second representations are generated using a first model, and wherein the first model is configured to segment a user inputted query into a sequence of units from a vocabulary of units and represent each unit in the sequence as an embedding vector, wherein at least one of the units in the vocabulary is an incomplete word.

8. The method according to claim 1, wherein the first tag is a slot value tag, wherein the model is a second model corresponding to a first slot and wherein the first sequence of first representations and second sequence of second representations are generated using a first model, wherein the method further comprises:
representing the input data as a third sequence of third representations, each representing a unit of the units of the input data;
representing the input data as a fourth sequence of fourth representations, each representing one of the units of the input data, wherein the third sequence of third representations and fourth sequence of fourth representations are generated using the first model;
using a further model corresponding to a second slot to determine a further tag sequence from the third sequence of third representations, wherein the further model comprises a combining layer using the fourth sequence of fourth representations;
if one or more units of the input data correspond to the first tag in the further tag sequence, determining the system dialogue act is further based on the part of the input data corresponding to the first tag in the further tag sequence.

9. The method according to claim 1, wherein the first sequence of first representations and second sequence of second representations are generated using a residual layer using information indicating whether a slot corresponding to the model was requested in a previous output.

10. A system, comprising:
an input configured to receive input data relating to a speech or text signal originating from a user;
an output configured to output speech or text information specified by a dialogue act; and
one or more processors, the one or more processors being configured to:

represent the input data as a first sequence of first representations, each representation of the first representations representing a respective unit of units of the input data;

represent the input data as a second sequence of second representations, each representation of the second representations representing a respective unit of the units of the input data, wherein the first sequence includes a representation of a given key phrase of the input data and the second sequence includes a representation corresponding to the given key phrase of the input data;

determine, using a model, a tag sequence for the first sequence of first representations, wherein the model employs a combining layer that combines the first sequence of first representations and the second sequence of second representations to determine the tag sequence, wherein the tag sequence comprises one or more tags from a set of tags, wherein the set of tags comprises a first tag;

determine whether one or more units of the input data correspond to the first tag; and determine, in response to determining that one or more units of the input data correspond to the first tag, a system dialogue act based on a given part of the input data corresponding to the first tag; and output speech or text information specified by the system dialogue act determined.

11. A computer implemented method of training a model, comprising:

receiving input data relating to a speech or text signal and template data relating to a speech or text signal, wherein a first part of the input data corresponds to a first unit in the template data;

representing the input data as a first sequence of first representations, each representation of the first representations representing a respective unit of units of the input data;

representing the template data as a second sequence of second representations, each representation of the second representations representing a respective unit of the units of template data including the first unit, wherein the first sequence includes a representation of a given key phrase of the input data and the second sequence includes a representation corresponding to the given key phrase of the input data;

determining, using a model, a tag sequence for the first sequence of first representations, wherein the model employs a combining layer that combines the first sequence of first representations and the second sequence of second representations to determine the tag sequence, wherein the tag sequence comprises one or more tags from a set of tags, wherein the set of tags comprises a first tag;

training the model to identify the first part of the input data as corresponding to the first tag.

12. The method of claim 11, wherein the model is a second model and wherein the first sequence of first representations and second sequence of second representations are generated using a first model, and wherein the method further comprises training the first model together with the second model.

13. The method of claim 12, further comprising:

receiving further input data relating to a speech or text signal, wherein a first part of the further input data corresponds to a slot value;

representing the further input data as a further sequence of first representations using the first model, each representing a unit of the further input data;

representing the input data as a further sequence of second representations using the first model, each representing one of the units of the further input data;

using the second model to determine a tag sequence from the further sequence of first representations;

training the second model to identify the first part of the input data as corresponding to the first tag, wherein the training comprises updating the parameters of the second model without updating one or more parameters of the first model.

14. The method according to claim 12, wherein the first model is configured to segment a user inputted query into a sequence of units from a vocabulary of units and represent each unit in the sequence as an embedding vector, wherein at least one of the units in the vocabulary is an incomplete word, wherein the vocabulary comprises the first unit.

15. The method according to claim 11, wherein the training is performed using labels corresponding to the input data, wherein the first part of the input data is labelled with the first tag, wherein a part of the input data before the first part is labelled with a before tag and wherein a part of the input data after the first part is labelled with an after tag.

16. The method according to claim 11, further comprising:

receiving further input data relating to a speech or text signal and further template data relating to a speech or text signal, wherein the template data does not comprise the first unit;

representing the further input data as a further sequence of first representations, each representing a unit of the further input data;

representing the further template data as a further sequence of second representations, each representing one of the units of the further template data including the first unit;

using the model to determine a tag sequence from the further sequence of first representations;

training the model to identify no parts of the input data as corresponding to the first tag.

17. The method according to claim 11, wherein the model is configured to generate a set of parameters for each unit representing a likelihood of each tag in the set for the unit, and a likelihood of each tag in the set for the unit together with each tag in the set for a following unit.

18. The method according to claim 11, wherein receiving input data relating to a speech or text signal and template data relating to a speech or text signal comprises:

receiving data relating to a plurality of speech or text signals;

identifying a key part of data for each signal;

determining template data and input data as a pair of signals comprising the same key part;

replacing the key part in the template data with a first unit, such that the key part of the input data corresponds to the first unit in the template data.

19. The system of claim 10, the one or more processors being further configured to:

receive input data relating to a speech or text signal and template data relating to a speech or text signal, wherein a first part of the input data corresponds to a first unit in the template data;

represent the input data as a first sequence of first representations, each representing a unit of the units of the input data;

represent the template data as a second sequence of second representations, each representing a unit of the template data including the first unit;

use the model to determine a tag sequence from the first sequence of first representations, and train the model to identify the first part of the input data as corresponding to the first tag.

20. A non-transitory computer readable storage medium comprising program instructions stored thereon that are executable by a computer processor to perform the following operations:

receiving input data relating to a speech or text signal originating from a user;

representing the input data as a first sequence of first representations, each representation of the first representations representing a respective unit of units of the input data;

representing the input data as a second sequence of second representations, each representation of the second representations representing a respective unit of the units of the input data, wherein the first sequence includes a representation of a given key phrase of the input data and the second sequence includes a representation corresponding to the given key phrase of the input data;

determining, using a model, a tag sequence for the first sequence of first representations, wherein the model employs a combining layer that combines the first sequence of first representations and the second sequence of second representations to determine the tag sequence, wherein the tag sequence comprises one or more tags from a set of tags comprising a first tag;

determine whether one or more units of the input data correspond to the first tag;

determining, in response to determining that one or more units of the input data correspond to the first tag, a system dialogue act based on a given part of the input data corresponding to the first tag; and outputting speech or text information specified by the system dialogue act determined.

* * * * *